(12) United States Patent
Trembly et al.

(10) Patent No.: US 12,584,017 B2
(45) Date of Patent: Mar. 24, 2026

(54) COAL PLASTIC COMPOSITES

(71) Applicant: Ohio University, Athens, OH (US)

(72) Inventors: Jason Patrick Trembly, Athens, OH (US); Keerti S. Kappagantula, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 16/500,168

(22) PCT Filed: Apr. 5, 2018

(86) PCT No.: PCT/US2018/026244
§ 371 (c)(1),
(2) Date: Oct. 2, 2019

(87) PCT Pub. No.: WO2018/187562
PCT Pub. Date: Oct. 11, 2018

(65) Prior Publication Data
US 2021/0102071 A1 Apr. 8, 2021

Related U.S. Application Data

(60) Provisional application No. 62/481,787, filed on Apr. 5, 2017.

(51) Int. Cl.
*C08L 95/00* (2006.01)
*C08L 23/06* (2006.01)
*C08L 23/12* (2006.01)

(52) U.S. Cl.
CPC .............. *C08L 95/00* (2013.01); *C08L 23/06* (2013.01); *C08L 23/12* (2013.01); *C08L 2205/035* (2013.01)

(58) Field of Classification Search
CPC .......... C08L 95/00; C08L 23/06; C08L 23/12; C08L 2205/035
See application file for complete search history.

(56) References Cited

U.S. PATENT DOCUMENTS

| | | | |
|---|---|---|---|
| 3,256,236 | A | 6/1966 | Herman et al. |
| 4,113,817 | A | 9/1978 | Kroger et al. |
| 5,468,550 | A | 11/1995 | Davis et al. |
| 8,901,209 | B2 | 12/2014 | Correa et al. |

FOREIGN PATENT DOCUMENTS

| | | |
|---|---|---|
| CN | 103073827 A | 5/2013 |
| CN | 104119589 A | 10/2014 |
| DE | 4140025 A1 | 6/1993 |
| GB | 770057 A | 3/1957 |

(Continued)

OTHER PUBLICATIONS

Hu, G. et al., "Polymer-coal composite as a novel plastic material," Materials Letters (2017) 197:31-34.

(Continued)

*Primary Examiner* — Catherine S Branch
*Assistant Examiner* — Andrea Wu
(74) *Attorney, Agent, or Firm* — Wood Herron & Evans LLP

(57) ABSTRACT

A composite is formed from a combination of a polymer and pulverized coal and optionally a compatibilizing agent. The coal forms from about 10 to about 80% of the composite. The composite is form by blending the pulverized coal with the polymer to form the composite.

1 Claim, 20 Drawing Sheets

PLANT FIBER + COUPLING AGENT + POLYMER → COMPOSITE

CHEMICALLY LINKED WITH STRONG INTERFACIAL BONDING

WETTING

(56) References Cited

FOREIGN PATENT DOCUMENTS

| KR | 20050054232 A | 6/2005 |
|----|---------------|--------|
| KR | 20060009200 A | 1/2006 |
| KR | 20080083080 A | 9/2008 |
| KR | 20110000336 A | 1/2011 |
| WO | 2014110792 A1 | 7/2014 |

OTHER PUBLICATIONS

International Search Report and Written Opinion in International Patent Application No. PCT/US2018/026244, mailed Jun. 28, 2018, 6 pgs.

Database WPI Week 200651 Thomson Scientific, London, GB; AN 2006-498070 XP002797902, & KR 2005 0054232 A (Korea Composite Res Co Ltd) Jun. 10, 2005 (Jun. 10, 2005) abstract.

Database WPI Week 200715 Thomson Scientific, London, GB; AN 2007-146751 XP002797901, & KR 2006 0009200 A (Hankook Ceramics Co Ltd) Jan. 31, 2006 (Jan. 31, 2006) abstract.

Database WPI Week 201116 Thomson Scientific, London, GB; AN 2011-A85833 XP002797903, & KR 2011 0000336 A (Su J P) Jan. 3, 2011 (Jan. 3, 2011) abstract.

Database WPI, Week 200921, Thomson Scientific, London, GB; AN 2009-E79254 XP002797900, & KR 2008 0083080 A (Neoeco Co Ltd) Sep. 16, 2008 (Sep. 16, 2008) abstract.

Database WPI, Week 201451, Thomson Scientific, London, GB; AN 2014-N69080, XP002797899, & WO 2014/110792 Ai (Zhang D) Jul. 24, 2014 (Jul. 24, 2014) abstract.

European Supplementary Search Report in European Patent Application No. 18780877.9, dated Mar. 4, 2020, 10 pgs.

Ahmad, I. et al., "Mechanical properties of Fly Ash Filled High Density Polyethylene," Journal of Minerals & Materials Characterization & Engineering, pp. 183-198, 2010.

Ahmed, S. et al., "A review of particulate reinforcement theories for polymer composites," Journal of Materials Science, pp. 4933-4942, 1990.

Atikler, U. et al., "Mechanical and Morphological Properties of Recycled High Density Polyethylene, Filled with Calcium Carbonate and Fly Ash," Journal of Applied Polymer Science vol. 102, 4460-4467, 2006.

Deepthi, M. et al., "Mechancial and thermal characteristics of high density polyethylene-fly ash cenospheres composites," Materials Design, vol. 31, No. 4, pp. 2051-2060, 2010.

Deng, S. et al., "Increasing load bearing capacity of wood plastic composites by sandwiching natural and glass fabrics," Journal of Reinforced Plastic Composites, vol. 29, No. 20, pp. 3133-3148, 2010.

English, B. et al., "Waste-Wood-Derived Fillers for Plastics," General Technical Report FPL-GTR-91, 2005.

Fu, S. et al., "Effects of particle size, particle_matrix interface adhesion and particle loading on mechanical properties of particulate-polymer composites," Composites: Part B, pp. 933-961, 2008.

Goertzen, S. et al., "Standardization of the Boehm titration: $CO_2$ expulsion and endpoint determination," Carbon, vol. 18, No. 4, pp. 1252-1261, 2010.

Gong, G. et al., "Mechanical properties and fracture behavior of injection and compression molded polypropylene/coal gangue powder composites with and without a polymeric coupling agent," Composites: Part A, pp. 1683-1693, 2007.

Huang, H. et al., "Effects of filler-filler and polymer-filler interactions on rheological and mechanical properties of HDPE-wood composites," Journal of Applied Polymer Science, pp. 2806-2812, 2009.

Kajaks, J. et al., "Some exploitation properties of wood plastic composites (WPC), based on high density polyethylene and timber industry waste," Materials Science, 2015.

Kerner, E. "The elastic and thermo-elastic properties of composite media," Proceedings of the Physical Society, pp. 808-813, 1956.

Leu, S. et al., "Optimized material composition to improve the physical and mechanical properties of extruded WPCs," Contrustion and Building Materials, vol. 29, pp. 120-127, 2012.

Li, Y., "Effect of coupling agent concentration, fiber content, and size on mechanical properties of wood/HDPE composites," International Journal of Polymeric Materials and Polymeric Biomaterials, pp. 882-890, 2012.

Pandey, K., "A study of chemical structure of soft and hardwood and wood polymers by FTIR spectroscopy," Journal of Applied Polymer Science, vol. 71, No. 12, pp. 1969-1975, 1999.

Pardo, S. et al., "Rheological, Thermal, and Mechanical Characterization of Fly Ash-Thermoplastic Composites with Different Coupling Agents," Polymer Composites, pp. 1722-1730, 2010.

Solomon, P. et al., "General model of coal devolatization," Energy & Fuels, vol. 2, No. 4, pp. 405-422, 1988.

Tabakhpaz, M. et al., "Procedure effect on the physical and mechanical properties of the extruded wood plastic composites," Polymer Composites, vol. 34, No. 8, pp. 1349-1356, 2013.

Thomas, S. et al., Polymer Composites, New York: Wiley-VCH Verlag GmbH & Co. KGaA, 2013, Section 2.5.4, pp. 28-31.

Indian Examination Report in Indian Patent Application No. 234546373267, dated Apr. 27, 2021, 7 pgs.

COAL PLASTIC COMPOSITES

CROSS-REFERENCE TO RELATED APPLICATIONS

This application claims priority to, and the benefit of the filing date of, U.S. Patent Application Ser. No. 62/481,787, entitled "Coal Plastic Composites," filed Apr. 5, 2017, the disclosure of which is incorporated by reference herein in its entirety.

FIELD OF THE INVENTION

The present invention relates generally to plastic composite materials, and relates more specifically to coal plastic composites.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

Plastic composites commonly used in outdoor applications, primarily wood plastic composites (WPC), experience a myriad of issues stemming from their tendency to absorb water. Currently, the U.S. manufactures 338,000,000 linear feet of WPCs annually, with a market value of $1.2 billion. WPCs using polyethylene (PE) as the primary component make up 93% of that market. WPCs have advantages over traditional wood or plastic materials alone, as they utilize beneficial properties from each component, resulting in a superior product. Wood is readily available and is a low-cost filler material, but the issues associated with using wood as filler require additional additives and make recycling difficult due to wood's low thermal stability.

Currently, most commercial WPCs are composed of up to 30 wt % wood powder/flour and additional components. Because thermoplastic resins dominate product price, there is a strong desire to manufacture WPCs with up to 70 wt % fillers. However, significant problems arise from increased wood content in WPCs including ultra-violet light degradation, fungal attack, discoloration, fire hazards, heat-freeze cycles, humidity, and temperature degradation which limit the solids percentage to 30%.

Due to the above plastic composites that do not suffer the drawbacks of WPCs are desired.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

Various aspects of the present invention address any and/or all of the drawbacks described above with current plastic composite materials, including wood plastic composites, of the prior art.

To that end, various aspects of the present invention are premised on the realization that thermoplastic composite materials can be reinforced with coal to produce coal plastic composites (CPC), resulting in materials with a high degree of flexural strength, tensile strength, thermal stability, moldability and low water absorption. As a filler material, coal is resistant to water absorption and fire, and is not prone to fungal attack. In addition, coal is a more cost-effective filler material with costs of $45/ton or $0.0225/lb, with bottom ash having even lower costs compared to wood flour.

The objects and advantages of the present invention will be further appreciated in light of the following detailed description.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

FIGS. 2A and 2B show the chemical structure of coal (FIG. 2A) and lignin (FIG. 2B).

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, various aspects of the present invention address the drawbacks described above in the Background.

According to various aspects of the present invention, coal plastic composites include polymers combined with pulverized coal and optionally coupling agents, thermal and UV stability agents, pigments or coloring agents, and flame retardants, as well as others.

Figure 1:
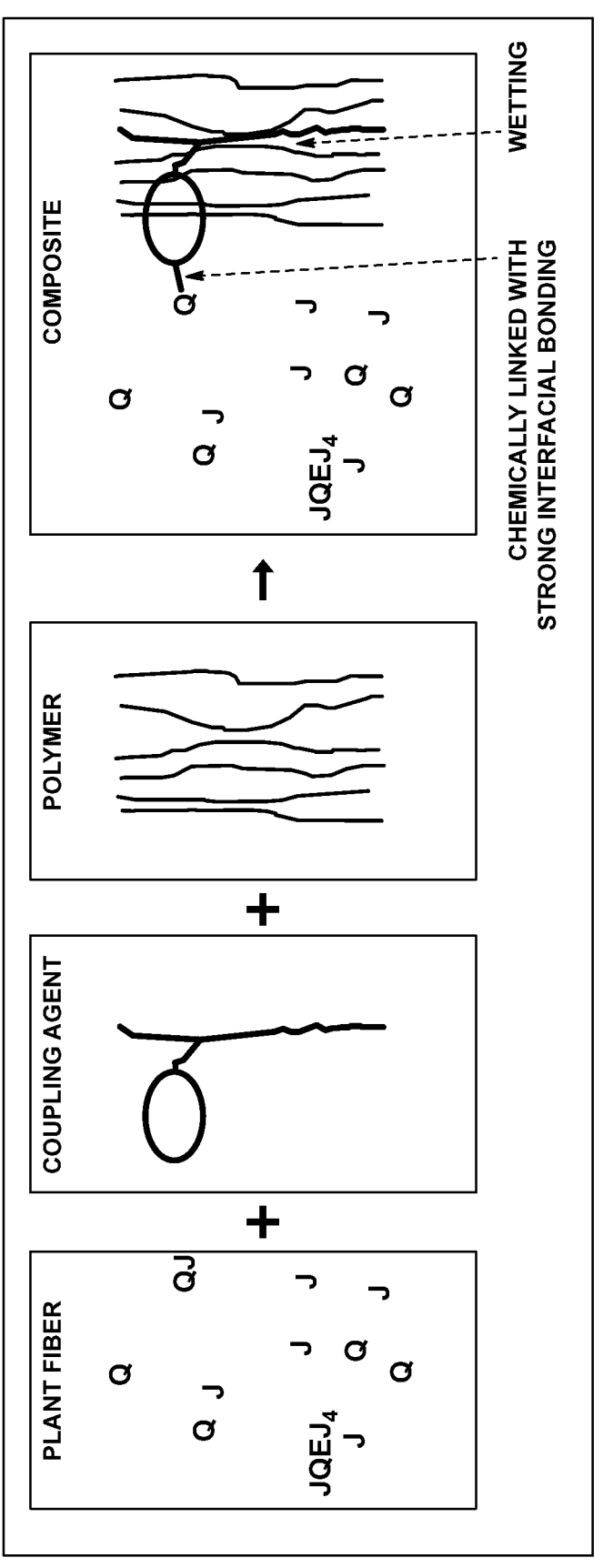
FIG. 1 shows the nature of bonding between thermoplastic and wood fibers in WPCs in the presence of coupling agents.

Polymer composites are typically thermoplastic materials reinforced with fillers such as wood flour, carbon fiber, glass fibers, ceramic particles, and polymer fibers. Polymer or plastic composites are commonly used as load bearing structural components in construction, transportation, power distribution, and aerospace industries. Plastic composites include a base polymer matrix, filler or reinforcement phase, and a coupling agent which forms a bridge between the polymer chains and the surface of the fillers as shown in FIG. 1. Typically, the carbon chain of the coupling agent interacts with the thermoplastic matrix while the functional part interacts chemically with the surface functionalities of the filler. When load is applied on the plastic composite, it is transferred from the polymer matrix to the reinforcement phase via the coupling agent bond [S. Thomas, K. Joseph, S. Malhotra, K. Goda and M. Sreekala, Polymer Composites, New York: Wiley-VCH Verlag GmbH & Co. KGaA, 2013.].

Figures 2A, 2B:
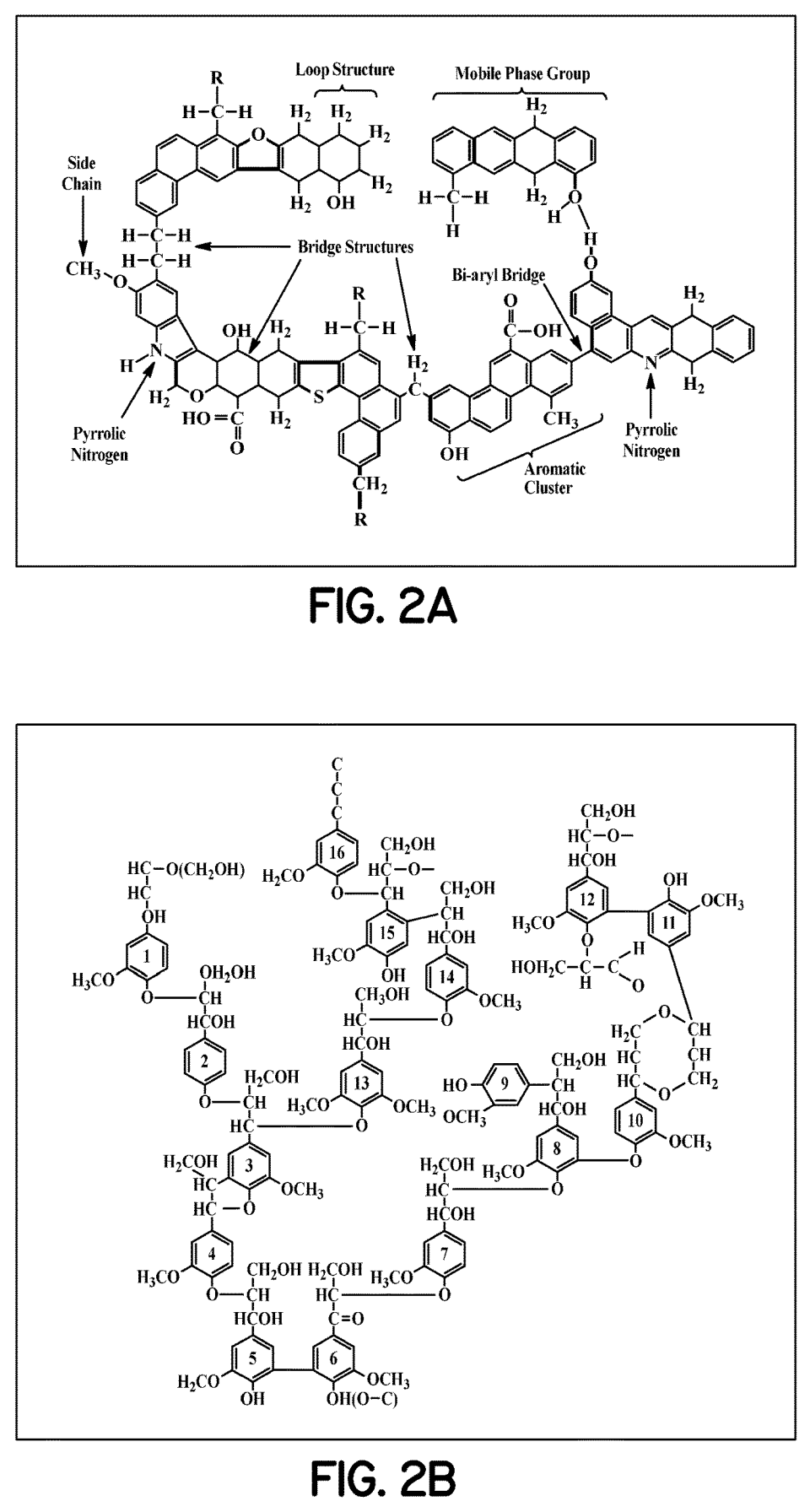

CPCs of the various embodiments of the present invention may include thermoplastics, such as high-density polyethylene (HDPE) or polypropylene (HDPP,) reinforced with coal particles and coupling agents, such as maleic anhydride-polyethylene (MAPE) and maleic anhydride-polypropylene (MAPP). The inventors determined that CPCs may have success as structural components because, owing to the similarity between the structures of wood and coal, they should both interact in a similar fashion with the coupling agents typically included in making thermoplastic-based polymer composites. In that regard, the chemical structure of coal, shown in FIG. 2A, consists of a heterogeneous mixture mainly composed of an organic macromolecular matrix with aromatic structures and varying degrees of crosslinking [P. Solomon, D. Hamblen, R. Carangelo, M. Serio and G. Deshpande, "General model of coal devolatization," Energy & Fuels, vol. 2, no. 4, pp. 405-422, 1988.]. The chemical structure of coal is dependent on the rank of the coal in that as the degree of metamorphism and rank increases, the oxygen and hydrogen content will decrease, and the crystallinity of coal's structure will increase. The coal structure possesses some degree of oxidation resulting in hydroxyl groups similar that of lignin in wood flour [K. Pandey, "A study of chemical structure of soft and hardwood and wood polymers by FTIR spectroscopy," Journal of Applied Polymer Science, vol. 71, no. 12, pp. 1969-1975, 1999]. (The chemical structure for lignin is shown in FIG. 2B.) These hydroxyl groups are ideal for reacting with grafted maleic acid contained in the MAPE and MAPP coupling agent.

In the various aspects and embodiments of the present invention, the polymers which may be used are suitable for use outdoors and include thermoplastic resins. Thermoplastic resins that may be in the present invention include, but are not limited to, polyolefins alone, polyamides alone, or blends of polyamides and polyolefins. Examples of polyolefins that may be used in the present invention include, but are not limited to, polypropylene, thermoplastic elastomers, and polyethylene, or subset plastic materials within each one of these members—for example, homopolymer or copolymer of polypropylene, high impact co-polymer polypropylene, random co-polymer polypropylene, atactic polypropylene, crosslinked polypropylene (XLPP), low density polyethylene (VLDPE), low density polyethylene (LDPE), medium density polyethylene (MDPE), high density polyethylene (HDPE), linear low density polyethylene (LLDPE), crosslinked polyethylene (XLPE), and ethylene/vinyl acetate copolymer (EVA). Similarly, thermoplastic elastomers may be based on polypropylene or polyethylene backbones and may further contain dispersed rubber particles that may be either thermoplastic or thermoset (e.g. dynamically vulcanized). Examples include, but are not limited to, ethylene propylene diene monomer (EPDM), maleated propylene diene monomer (m-EPDM), ethylene-polypropylene copolymer, and maleated ethylene-polypropylene copolymer (m-EP copolymers). Also included are styrene polymers such as polystyrene, substituted polystyrene, and impact-modified polystyrene containing rubber such as butadiene, acrylonitrile butadiene styrene and other styrene containing copolymers. Other thermoset polymers can also be used in the present invention. Generally, the polymer forms the balance of the composite and generally will be 20 wt % to 90 wt %, typically 30 wt %-70 wt %.

The pulverized coal used in the present invention can be, for example, lignite, sub bituminous, bituminous, anthracite, or mixtures of these. These may be ground to a particle size of about 5 to about 300 μm, generally about 25-50 μm. Generally, the coal plastic composite will include from about 10% to about 80% by weight of pulverized coal, generally about 30 wt % to 70 wt %, and in certain situations 45 wt % to 60 wt % coal.

In addition to the polymer and coal, a coupling agent or compatibilizing agent can also be employed. Various suitable compatibilizing agents are disclosed in U.S. Pat. No. 8,901,209, which is incorporated herein by reference. Hydrophilic group grafted polyolefins can be used. One particular compatibilizing agent is maleic anhydride grafted polyethylene (MAPE), although agents such as maleic anhydride modified polypropylene (MAPP) or wax can also be used. Other coupling agents well known in the industry can also be used in the present invention. Generally, the coupling agent will be present in about an amount of 0 to 7%, generally from 0.05 to 3% and, in certain situations, 0.05 to 1.0%.

Thermal stabilizers can also be employed, such as low volatility and hydrolysis-resistant organophosphites and hindered phenolic antioxidants can be employed. The thermal stabilizer can be present in an amount from zero to about 3%, generally 0.01 to 1%.

A suitable UV stabilizer for use in the present invention includes UV absorbers that act by shielding the composition from ultraviolet light, or hindered amine light stabilizers that act by scavenging the radical intermediates formed in the photo oxidation process. Generally, any UV stabilizer utilized in polyethylene or propylene siding can be used in the present invention. Again, generally from 0 to about 3% of the UV stabilizer can be employed in the present invention, typically 0.01 to 1% and, in particular, 0.1 to about 0.8% by weight.

The composite can also include pigments, dyes or other coloring agents typically used in plastics suitable for outdoor purposes.

To formulate the composite of the present invention, the pulverized coal is initially heated to remove all moisture. This can be generally done by heating the coal to a temperature of 100° C. for an hour or more, until all surface moisture is removed.

Mixing equipment is selected based on the particular polymer. Generally, all of the components are blended together in a mixer and then either extruded or molded to form the composite material. With thermoplastic polymers, the polymer is blended with the coal and any necessary additives, such as a thermal stabilizer, UV stabilizer, pigments, coupling agents and flame retardants at elevated temperature and then formed into pellets. The pellets are formed into articles by molding or extrusion in order to form the final product.

The various aspects of the present invention will be further understood with reference to the following examples.

EXAMPLES

This study described in the Example below examined the effectiveness of using coal as a filler in making reinforced thermoplastic composites, termed coal-plastic composites (CPCs). CPCs were evaluated to replace commercially available wood plastic composites (WPCs) made with thermoplastics reinforced with wood flour, typically used as structural components in buildings, construction, automotive and electrical industry. Three coal types, namely Pittsburgh No. 8, Kittaning, and Upper Freeport, were evaluated. CPCs were made with virgin high density polyethylene and polypropylene, as well as recycled polyethylene. The impact of coal particle size, coal content, polymer type, and coupling agent content on the tensile strength, elastic modulus, flexural strength, flexural modulus, coefficient of thermal expansion, water absorption, and heavy metal leaching of CPCs was investigated. CPCs demonstrated flexural strength comparable to commercially available WPCs. Additionally, CPCs demonstrated water absorption lower than that of commercially available WPCs. Leaching of heavy metals from coal in the CPCs after treatment with water with varying pH was found to be less than the EPA promulgated TCLP regulated levels; only zinc, iron, and magnesium were detected from the coal leaching tests at trace quantities. The study described in this Example used coal particles as is, without necessitating any coal cleaning processes, and does not produce any environmentally detrimental by-products.

Materials and Methods

CPC Synthesis

HDPE and HDPP supplied by (and commercially available from) Sigma Aldrich (547999 Aldrich) with a melt flow index of 2.2 g/10 min and Vicat softening point of 123° C. were used as virgin matrix materials. Recycled HDPE (R-HDPE) supplied by (and commercially available from) McDunnough Inc. with a crystallization onset temperature of 103° C. was evaluated as the recycled polymer material. MAPE and MAPP supplied by (and commercially available from) Sigma Aldrich (456632 Aldrich) were used as the coupling agent. The coals used were Pittsburgh No. 8 (Pitt No. 8), Kittaning, and Upper Freeport. Particles sizes evaluated were <125 μm, 125-210 μm, and 210-297 μm.

When synthesizing CPC, several parameters were considered. The process used to compound the components was controlled in terms of temperature and speed. Before compounding, coal samples were dried for at least 5 hrs. at 100° C. to remove any surface moisture that would interfere with polymer adhesion during mixing. To compound the coal and polymer materials, a HAAKE™ MiniCTW Micro-Conical Twin Screw Compounder (HAAKE compounder) (such as is commercially available from ThermoFisher Scientific) was used. This compounder is capable of making approximately 4 g of composite per batch. Requisite quantities of polymer, coupling agent, and coal were weighed and dry mixed for one hour prior to compounding using a roller mill. Table 1 presents the initial HAAKE compounder settings used in composite compounding.

TABLE 1

| HAAKE compounder settings for making CPC samples. | | |
|---|---|---|
| Temperature (° C.) | Screw Speed (RPM) | Cycle Time (min) |
| 160 | 20 | 2 |

Figure 3B:
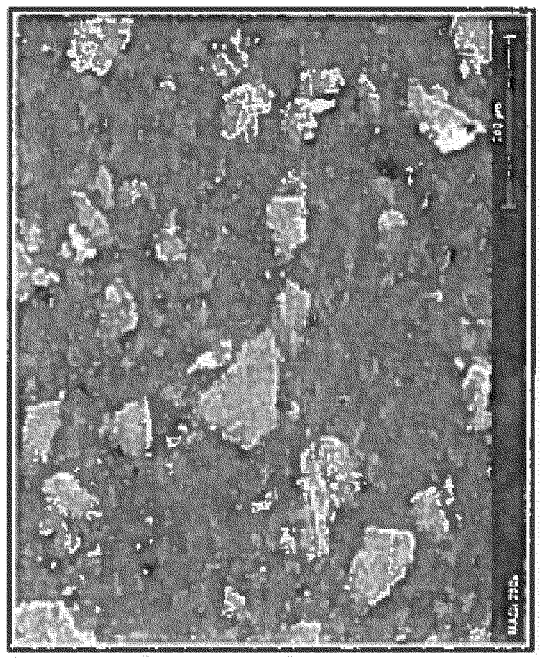
FIGS. 3A and 3B show an optical microscopy image of a coal plastic composite with 50 wt % coal and 50 wt % polyethylene at 100× magnification (FIG. 3A), and a scanning electron microscope image of a coal plastic composite with 50 wt % coal and 50 wt % polyethylene at 200× magnification (FIG. 3B).
Figure 3A:
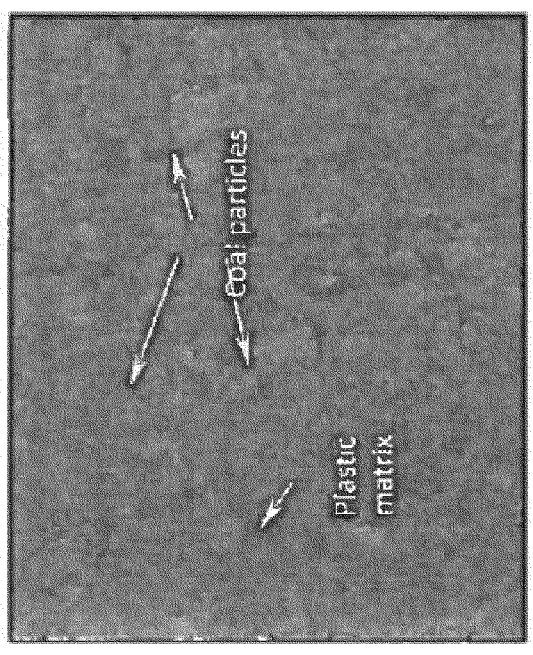

In an initial run, the compounded mixture was extruded in the form of a filament, which was reclaimed and pelletized. The compounded CPC was imaged with a Nikon Epiphot 200 optical microscope (OM) and a JEOL JSM6390 scanning electron microscope (SEM) to visualize coal particle distribution in its microstructure. FIG. 3A and 3B shows the OM and SEM images of the CPC with 50 wt % coal and 50 wt % polyethylene at 100× and 200× magnifications respectively. The images show a uniform distribution of the coal particles in the CPC microstructure which implies that the CPCs have uniform, isotropic physical properties.

Figure 4A:
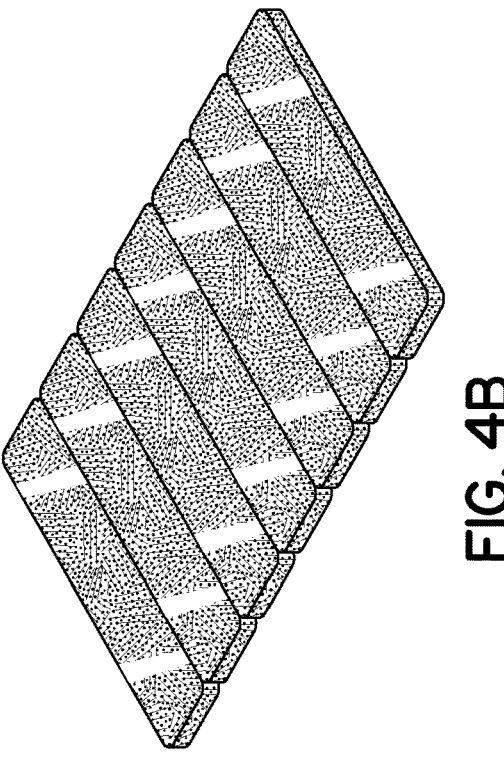
FIGS. 4A and 4B are perspective views of tensile testing CPC samples (FIG. 4A) and flexural testing CPC samples (FIG. 4B) compression molded according to ASTM standards.
Figure 4B:
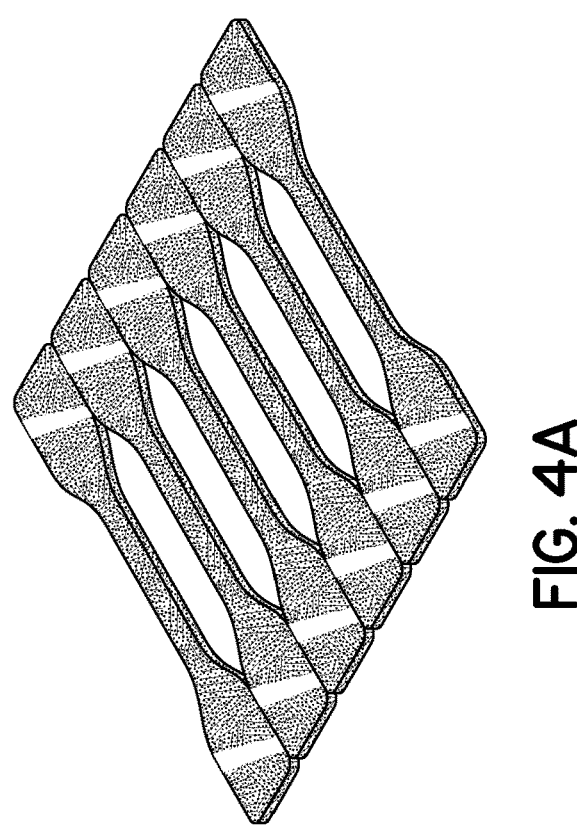

The composite material compounded was formed into test sample specimens with dimensions following ASTM standards using compression molding. Tensile, flexural, and water absorption specimens were made according to ASTM standards D638, D790, and D570 respectively. The compression molds were first coated using a mold release agent, allowing the specimens to be easily removed from the molds after compression. The composite material was heated in an oven at 180° C. and then deposited into a mold that heated to 100° C. (less than the Vicat softening point). The mold was pressed with a force of 18 metric tons using a Carver hydraulic press (Model 3853) with heated platens set to 100° C. The mold was then allowed to cool to room temperature, and the CPC specimens, as shown in FIGS. 4A and 4B, were reclaimed for mechanical property testing.

CPC Characterization

Physical and mechanical properties of the composite were analyzed to determine composition ratios and manufacturing procedures for consideration in scaled up manufacturing. Mechanical properties, including tensile strength, elasticity modulus, flexural strength, flexural modulus, were determined to evaluate CPC performance in comparison to WPCs.

Surface Area Determination

The sieved coal was analyzed to characterize its particle size distribution, and surface area. Particle size analysis was performed using a Mastersizer 2000. A Micromeritics ASAP 2020 was used to obtain the Brunauer-Emmett-Teller (BET) surface area and porosity of the coal samples. The coal samples were dried for 48 hours before analysis at 105° C. and then stored in a desiccator. Directly prior to analysis, samples were flushed with nitrogen at 120° C.

Proximate and Ultimate Analysis

Proximate analysis was performed on the three coal types using a Q500 (TA instruments Inc.) thermogravimetric analyzer. Moisture content, volatile matter, fixed carbon content and ash content were determined from the proximate analysis by measuring sample mass loss as it was heated to 900° C. at 10° C./min in nitrogen, then holding at 900° C. and switching to air. Ultimate analysis was performed using an elemental analyzer (Flash 2000 series, Thermo Scientific) in CHNS mode. The coal samples were combusted in a pure oxygen environment and the resulting combustion gases were measured using gas chromatography with a thermal conductivity detector. The carbon, hydrogen, nitrogen, and sulfur mass fractions were determined from combustion gas analysis. Oxygen was determined via mass difference.

Sample Microscopy

Optical microscopy was used to observe dispersion of coal particles within the composite. Optical microscopy samples were prepared by encasing CPC samples in epoxy and grinding their surface with 100, 240, 400 and 600 grit abrasive paper. The samples were polished using a suspended polishing compound of 3, 0.5 and 0.1 μm particle size. The samples were then examined using a Keyence microscope at 100-800 magnification.

Tensile Testing

Figure 5:
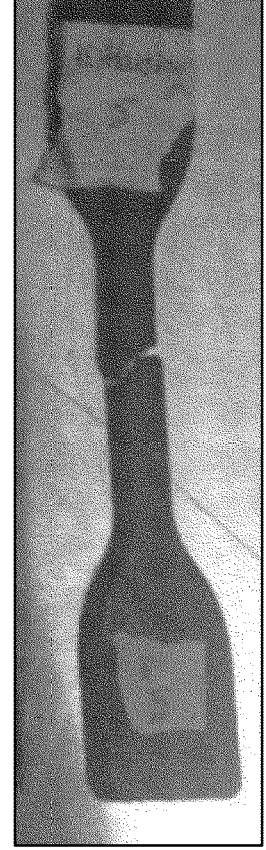
FIG. 5 is an image of a CPC tensile test sample after the test showing necking and break.

Tensile testing is used to determine multiple material properties including tensile strength, yield strength, elasticity modulus and strain. For CPCs, the tensile strength (TS) and elasticity modulus (E) were determined from data collected while applying a tensile load on a CPC specimen. The tensile test procedure and specimen dimensions followed ASTM D638. An Instron 5567 testing machine and tensile test fixture were used to perform the tensile tests. The force applied by the Instron and the elongation experienced by the specimen were recorded using Bluehill 2 software and exported into Microsoft Excel. The variation of stress (MPa) in the specimen as a function of strain (mm/mm) was used to determine the tensile strength (Pa) and elastic modulus (Pa) of the material. FIG. 5 shows the tensile test sample after the test showing necking and break.

Flexural Testing

Figure 6:
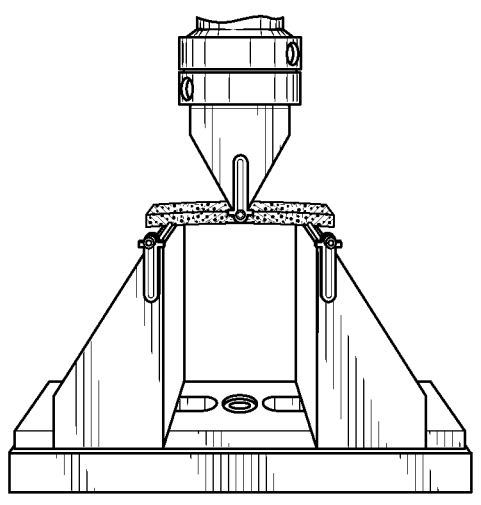
FIG. 6 is a perspective view of a three-point bending test fixture.

To determine composite flexure strength and modulus a three-point bending test was performed using the Instron 5567 and a three-point bending test fixture according to ASTM D790. FIG. 6 shows the three-point bending test fixture. A downward force was applied to the CPC specimen at a constant crosshead rate at the center of the specimen length. The test was stopped when the maximum strain in the specimen outer surface reached 0.05 mm/mm.

The force applied by the Instron and the deflection experienced by the specimen were recorded using Bluehill 2 software and exported into Microsoft Excel. The flexural modulus (EB) and flexural strength (FS) were determined from the graphed data. The flexural strength was determined by the maximum stress the sample experiences before fracture and the flexural modulus was determined from the slope of the load-deflection curve. Equations 1, 2, and 3 (shown below) were used to calculate flexural stress and flexural modulus.

$$FS = \frac{3YL}{2bt^2} \qquad \text{Equation 1}$$

$$\varepsilon_f = \frac{6Dt}{L^2} \qquad \text{Equation 1}$$

$$E_B = \frac{YL^3}{4bDt^3} \qquad \text{Equation 2}$$

where L is the length of the support span, t is the thickness of the beam, b is the width of the beam, Y is the yield stress, D is the deflection in the sample, and $\varepsilon f$ is the strain experienced by the beam. It can be seen that EB (Pa) is equal to FS (Pa) divided $\varepsilon f$.

Error propagation from the strength analyses was caused by limited accuracy of various components of the Instron and human error, primarily dimension measuring methods. These sources of error resulted in error propagation that were taken into consideration when analyzing the strength results. The accuracy of the components of the Instron are given in the Instron equipment reference manual (M10-14190-EN) and are shown in Table 2. When calculating the error associated with the strength results, the uncertainty associated with the measuring the specimen dimensions was taken into consideration. A caliper with an accuracy of 0.001 mm (and therefore uncertainty of ±0.0001 mm) was used to measure the dimensions of each specimen before testing.

TABLE 2

Accuracy of Instron measurements.

| Parameter | Accuracy |
| --- | --- |
| Extension | ±0.05% of displayed reading |
| Load | ±0.5% of reading |
| Strain | ±0.5% of extensometer reading |

Five thickness and width measurements were taken of the narrow section of the tensile test specimen, and the average of these measurements was used to calculate the cross-sectional area of the test specimen. For the flexural test specimens, five thickness and width measurements were taken along the entire length of the test specimen and the thickness and width are measured at the middle of the test specimen length where the force was applied during testing. The dimension measurements along with measurements obtained from the Instron were used to calculate the strength and moduli for each CPC composition. The uncertainties associated with each measurement was used to calculate the total uncertainty associated with the strength and moduli.

Coal Surface Functionality Determination

Figure 7:
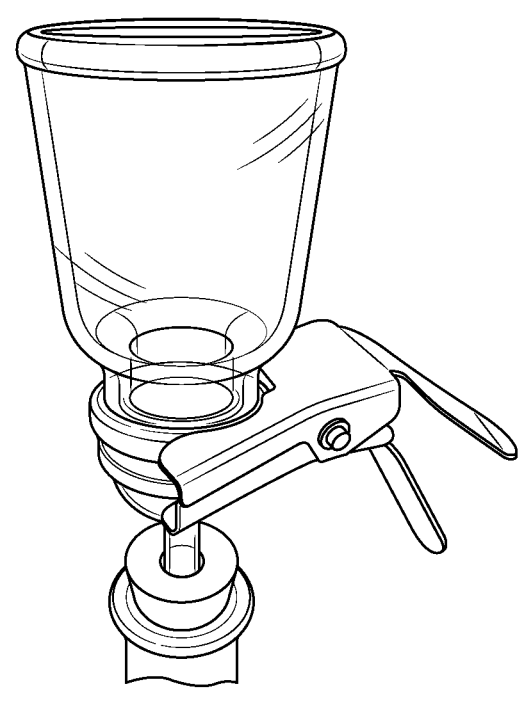
FIG. 7 is a perspective view showing a PTFE filter centered on a glass funnel in a side view of the funnel and clamp.
Figure 8B:
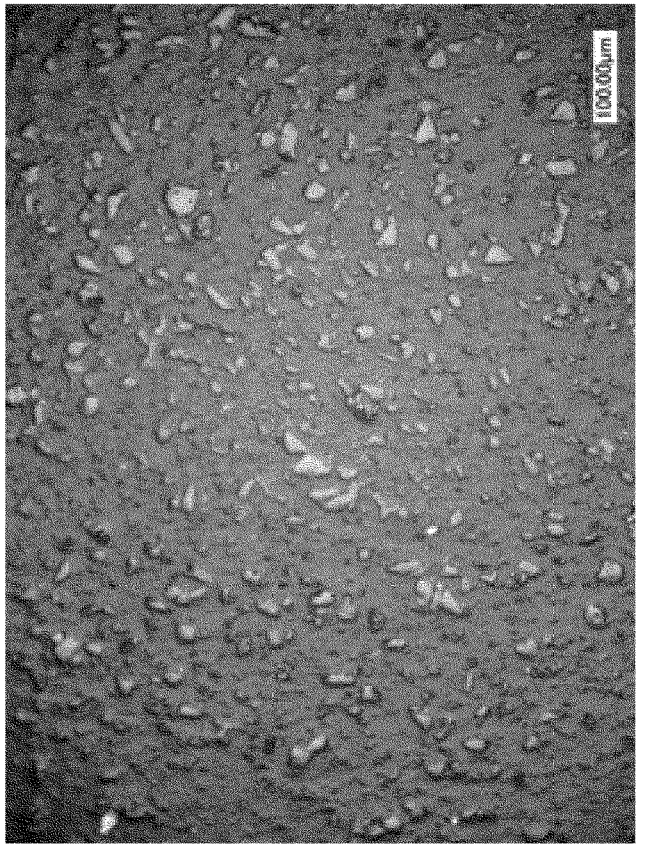
FIGS. 8A, 8B, 8C, and 8D are optical microscopy images of 15 wt % (FIG. 8A), 30 wt % (FIG. 8B), 45 wt % (FIG. 8C), and 60 wt % (FIG. 8D) Pittsburgh No. 8 composite samples.
Figure 8A:
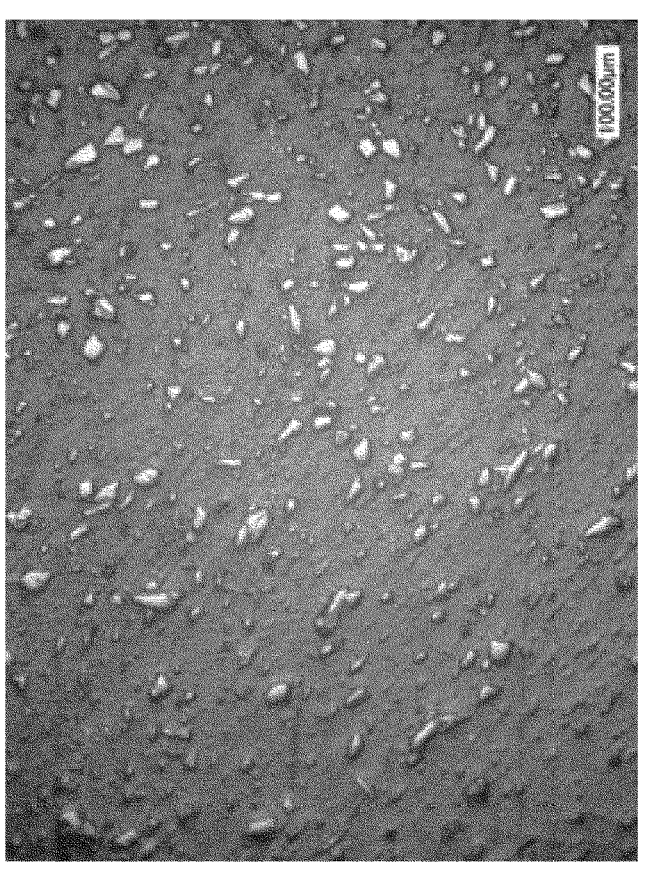
Figure 8D:
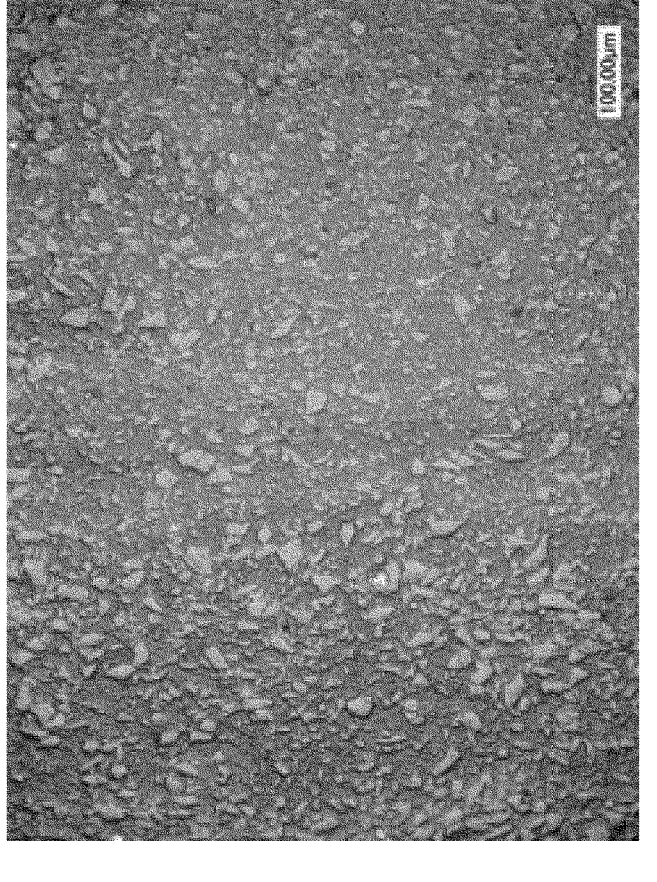
Figure 8C:
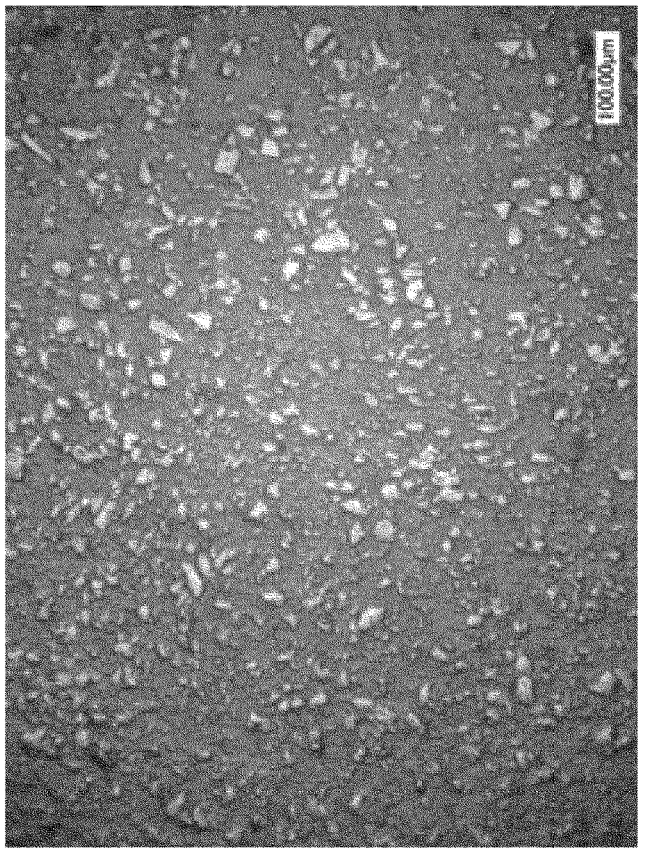

Boehm titrations were performed to identify acidic and basic surface functional group concentrations on the Pitt No. 8 coal surface according to previously reported methodologies [S. Goertzen, K. Theriault, A. Oickle, A. Tarasuk and H. Andreas, "Standardization of the Boehm titration: CO2 expulsion and endpoint determination," Carbon, vol. 48, no. 4, pp. 1252-1261, 2010, incorporated by reference herein in its entirety]. Before titrating, an acid-base wash of 0.05 M hydrochloric acid (HCl) and 0.05 M sodium hydroxide (NaOH) was performed on the coal samples followed by an acid rinse of 0.025 M HCl to protonate acidic carbon sites. Samples were then dried at 105° C. for 24 hrs. After drying, the coal samples were mixed into 30 mL each of 0.01 M sodium bicarbonate ($NaHCO_3$), 0.005 M sodium carbonate ($Na_2CO_3$), 0.01 M NaOH, and 0.01 M HCl and all solutions were placed on a shaker for 24 hours at 300 RPM. The coal was filtered from the solution using PTFE filter circles and a Buchner funnel setup, as shown in FIG. 7.

After filtering, 25 mL aliquots of each sample solution were taken. The 25 mL aliquots were then added to 75 mL of 0.01 M HCl for the basic solutions and 75 mL of deionized (DI) water for the acidic solution. Blank samples were prepared of each solution to use as a reference when analyzing the results of the coal samples. Each sample was sparged with nitrogen for 30 minutes immediately before titrating. Two 40 mL aliquots were titrated against a 0.01 M NaOH titrant using a Mettler Toledo T50 autotitrator. The 0.01 M NaOH titrant was sparged with nitrogen and kept sealed in a titrant bottle with carbon dioxide ($CO_2$) absorber used to filter the inlet air.

Goertzen et al. defined the following equations for calculating the quantity of surface groups [S. Goertzen, K. Theriault, A. Oickle, A. Tarasuk and H. Andreas, "Standardization of the Boehm titration: CO2 expulsion and endpoint determination," Carbon, vol. 48, no. 4, pp. 1252-1261, 2010]. Equations 4 and 5 were used for back titration and direct titration calculations respectively, $$\eta_{CSF}(\text{Back Titration}) = \frac{n_{HCl}}{n_B}[B]V_B - ([HCl]V_{HCl} - [NaOH]V_{NaOH})\frac{V_B}{V_a} \qquad \text{Equation 3}$$

$$\eta_{CSF}(\text{Direct Titration}) = [B]V_B - [HCl]V_{HCl}\frac{V_B}{V_a} \qquad \text{Equation 4}$$

where $\eta_{CSF}$ is the moles of surface functionalities on the surface of the coal, $n_{HCl}$ and nB are the normality of the HCl and base solutions used, [B] and $V_B$ are the concentration (M) and volume (L) of the base solution used, [HCl] and $V_{HCl}$ are the concentration and volume of HCl in the sample aliquot, [NaOH] and $V_{NaOH}$ are the concentration and volume of the NaOH titrant added to reach the endpoint, and $V_a$ is the volume of the base in the aliquot. The moles of surface functionalities calculated were divided by the sample mass (g) to determine the concentration of surface functionalities (mol/g).

The concentration of surface groups was determined assuming HCl neutralizes basic sites and the bases used neutralize various strength acid sites; NaOH neutralizes weak acid sites with carboxylic, phenolic and lactonic groups, $Na_2CO_3$ neutralizes moderate strength acid sites with lactonic and carboxylic groups, and $NaHCO_3$ neutralizes strong acid sites with carboxylic groups. The data collected from the autotitrator was used to create pH curves of the titrations and these curves were then used to determine the endpoints and volume of titrant used at the endpoint. The titration curves were also used to determine whether there were any contaminants, such as carbonic acid (absorbed $CO_2$), present in the samples.

Water Absorption Testing

Water absorption of HDPE-CPCs with varying coal content was tested per ASTM standard D570. HDPE-CPC discs of known weight were immersed in water for a period of 2 h and 24 h as prescribed. The increase in the weight of the samples was measured after the time period and amount of water absorbed was recorded.

Coefficient of Thermal Expansion Testing

The coefficients of thermal expansion were determined following ASTM D6341. Rectangular specimens were conditioned at −34, 20 and 60° C. After being conditioned at each temperature the specimen was measured lengthwise to the nearest 0.01 mm. Equations 6 and 7 were used to calculate the coefficient of linear thermal expansion, $$\alpha = \frac{1}{L_2}m \qquad \text{Equation 5}$$

$$m = \frac{3(\sum L_i T_i) - (\sum L_i)(\sum T_i)}{3(\sum T_i^2) - (\sum T_i)^2} \qquad \text{Equation 6}$$

where $\alpha$ is the coefficient of linear thermal expansion, $L_i$ is the sample length at temperature $T_i$ (where $T_2$ is room temperature, 23° C.), and m is the slope of the best fit line for the data points determined by the least squares criterion.

Leaching from CPCs

The coal in CPCs has an ash content composed mainly of aluminum, silica, and iron, with other trace elements (zinc, copper, boron, lead, arsenic, cadmium, chromium, and selenium), all typically in oxide form. These metal oxides have various solubility in water at different levels of pH. Concentrations of heavy metals leaching from CPCs when they are exposed to fluids of varying pH were determined by assessing solubility of these metals in water mimicking the pH of acid rain, healthy rain, and lake water. In this test, 500 mL solutions with varying nitric acid ($HNO_3$) concentrations as shown in Table 3 (below) were synthesized with the supposition that acid rain has a pH of 4.2, healthy rain has a pH of 5.6, and lake water has a pH of 6.5. The weight and surface area of CPC samples in the form of bars with an average length of 3 cm and width of 1 cm were determined initially. Subsequently, CPC samples were placed in the $HNO_3$ solutions with varying pH levels and the solutions was stirred continuously for 168 hours using a stir-plate. The acid solution was decanted and introduced into an inductively coupled plasma mass spectrometer (ICP-MS) to find the trace element content. The detection limits of the ICP-MS measurements were set based on the TCLP regulation levels promulgated by EPA. Table 4 (below) presents the upper and lower detection limit (mg/L) of arsenic (Ar), cadmium (Cd), chromium (Cr), lead (Pb), selenium (Se), and mercury (Hg). In addition to the elements listed in Table 4, acid solutions were also tested to detect aluminum (Al), beryllium (Be), iron (Fe), magnesium (Mg), nickel (Ni), and zinc (Zn) with the upper and lower detection limits set for the ICP-MS as shown in Table 5 (below), to determine whether the coal in the CPCs may be leaching these elements.

TABLE 3

Composition of the acidic solutions used for the leaching tests.

| Targeted acid source to mimic | Concentration of nitric acid in the leaching solution | pH |
|---|---|---|
| Acid rain | 0.000063 | 4.2 |
| Healthy rain | 0.0000025 | 5.6 |
| Lake water | 0.00000021 | 6.5 |

TABLE 4

Detection limits of heavy metals in the leaching test with TCLP regulatory levels.

| Limit (mg/L) | As | Cd | Cr | Pb | Se | Hg |
|---|---|---|---|---|---|---|
| Upper | 144 | 22.5 | 10.4 | 414 | 158 | 48.6 |
| Lower | 3.60 | 0.56 | 0.26 | 10.4 | 3.95 | 1.22 |
| TCLP Reg Level | 5.0 | 1.0 | 5.0 | 5.0 | 1.0 | 0.2 |

TABLE 5

Detection limits of other metals in leaching test

| Limit (M) | Al | Be | Fe | Mg | Ni | Zn |
|---|---|---|---|---|---|---|
| Upper | 53.96 | 9.58 | 111.69 | 4.86 | 11.74 | 13.06 |
| Lower | 1.35 | 0.24 | 2.79 | 0.12 | 0.29 | 0.33 |

Results

Coal Surface Area

The three types of coal evaluated in this project, namely, Kittaning, Upper Freeport, and Pittsburgh No. 8 were pulverized initially and then sieved using a 120 mesh. Surface area of the coal varieties evaluated using BET analysis are shown in Table 6 below.

TABLE 6

BET surface area analysis results of Ohio coal varieties.

| Coal type | Surface area (m²/g) |
|---|---|
| Pittsburgh No. 8 | 1.30 |
| Kittaning | 6.05 |
| Upper Freeport | 0.65 |

Proximate and Ultimate Analysis

Table 7 presents the proximate and ultimate analysis of the three varieties of coal evaluated in this project. Oxygen content was determined based on mass balance.

TABLE 7

Proximate and ultimate analyses of Ohio coal evaluated.

| Category | Pitt No. 8 | Kittanning | Upper Freeport |
|---|---|---|---|
| | Proximate Analysis | | |
| Volatile Matter [wt. %] | 34.78 | 36.34 | 40.00 |
| Fixed Carbon [wt. %] | 56.12 | 56.82 | 41.05 |
| Ash [wt. %] | 9.1 | 6.84 | 18.95 |
| | Ultimate Analysis | | |
| C [wt. %] | 74.84 | 72.65 | 57.05 |
| H [wt. %] | 5.09 | 5.09 | 4.29 |
| N [wt. %] | 1.49 | 1.61 | 1.21 |
| S [wt. %] | 4.57 | 2.69 | 12.03 |
| O [wt. %] | 14.01 | 17.96 | 25.42 |

Optical Microscopy Analysis

Dispersion of coal particles in the composite was observed through optical microscopy. FIG. 8 shows images of HDPE-CPCs with 15-60 wt % coal content and no coupling agent. Coal particles in these images are seen as bright irregular shaped particles, with the HDPE matrix appearing as dark grey material in between the particles. The compounding procedure showed sufficient dispersion of coal particles throughout the HDPE matrix. Homogeneous coal particle distribution through the composites is assumed to have been achieved based upon microscopy and physical properties (small standard deviations) determined throughout this study.

Mechanical Performance a. Effect of Coal Type

Figures 9A, 9B:
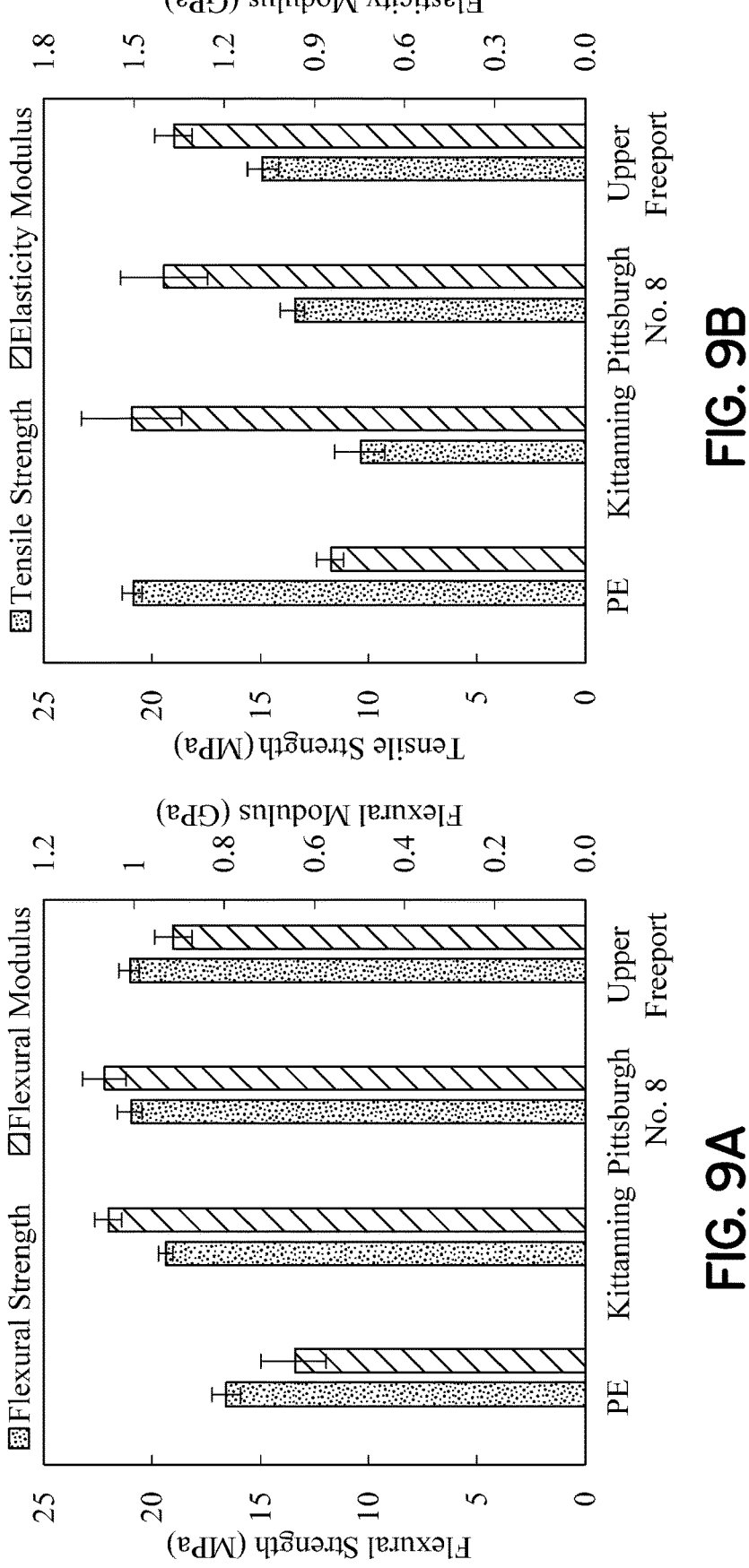
FIGS. 9A and 9B are graphs showing properties of composites made with 30 wt % coal and 3 wt % maleic anhydride-polyethylene (MAPE), with FIG. 9A showing flexure strength and flexure modulus results, and FIG. 9B showing tensile strength and modulus of elasticity results. Bituminous coal types evaluated include Kittanning, Pittsburgh No. 8, and Upper Freeport.

FIG. 9 shows the flexural strength, flexural modulus, tensile strength and elasticity modulus of HDPE-CPCs made with varying coal type. A MAPE content of 3 wt % was chosen for these studies based upon previous WPC research where 3 wt % MAPE was a median coupling agent content resulting in improved WPC mechanical properties [Y. Li, "Effect of coupling agent concentration, fiber content, and size on mechanical properties of wood/HDPE composites," International Journal of Polymeric Materials and Polymeric Biomaterials, pp. 882-890, 2012], [J. Kajaks, A. Zagorska and A. Mezinskis, "Some exploitation properties of wood plastic composites (WPC), based on high density polyethylene and timber industry waste," Materials Science, 2015]. Flexural strength and modulus for the HDPE matrix were measured to be 16.56 MPa and 0.64 GPa, respectively. Addition of 30 wt % coal resulted in greater flexural strength and modulus than the virgin HDPE, with increases of 16.5-28.6% and 41.7-65.5%, respectively. CPC samples containing 30 wt % Pitt No. 8 coal showed the greatest flexural strength (20.92 MPa) and modulus (1.064 GPa). Composites made with Kittanning and Upper Freeport coals possessed flexure strengths within the error of measurement of the Pittsburgh No. 8 samples.

Tensile strength of the 30 wt % coal composites was lower (28-50%) than the virgin HDPE with increases in modulus of elasticity (61-71%). Similar results of tensile strength loss and increased elasticity modulus have been observed with other particulate composites [I. Ahmad and P. Mahanwar, "Mechanical properties of Fly Ash Filled High Density Polyethylene," Journal of Minerals & Materials Characterization & Engineering, pp. 183-198, 2010], [G. Gong, B. Xie, M. Yang, W. Yang, W. Zhang and M. Zhao, "Mechanical properties and fracture behavior of injection and compression molded polypropylene/coal gangue powder composites with and without a polymeric coupling agent,"

Composites: Part A, pp. 1683-1693, 2007], [U. Atikler, D. Basalp and F. Tihminlioglu, "Mechanical and Morphological Properties of Recycled High Density Polyethylene, Filled with Calcium Carbonate and Fly Ash," Wiley Interscience, 2006], [S. Pardo, C. Bernal, A. Ares, M. Abad and J. Cano, "Rheological, Thermal, and Mechanical Characterization of Fly Ash-Thermoplastic Composites with Different Coupling Agents," Polymer Composites, pp. 1722-1730, 2010]. Atikler et al. observed a 19% loss in tensile strength and a 44% increase in the elasticity modulus of a 30 wt % untreated fly ash filled HDPE composite [U. Atikler, D. Basalp and F. Tihminlioglu, "Mechanical and Morphological Properties of Recycled High Density Polyethylene, Filled with Calcium Carbonate and Fly Ash," Wiley Interscience, 2006]. The decrease in tensile strength can be attributed to poor interfacial adhesion, resulting in inadequate stress transfer across filler particles throughout the polymer matrix. Based upon these results, Pittsburgh No. 8 coal was selected for further analyses as it is the least expensive of the three types due to abundance and lower cost mining methodology ["Table 5. Coal production and coalbed thickness by major coalbeds and mine type, 2015," 14 7 2017. [Online]. Available: https://www.eia.gov/coal/annual/pdf/table5.pdf].

b. Effect of Coal Particle Size

Figures 10A, 10B:
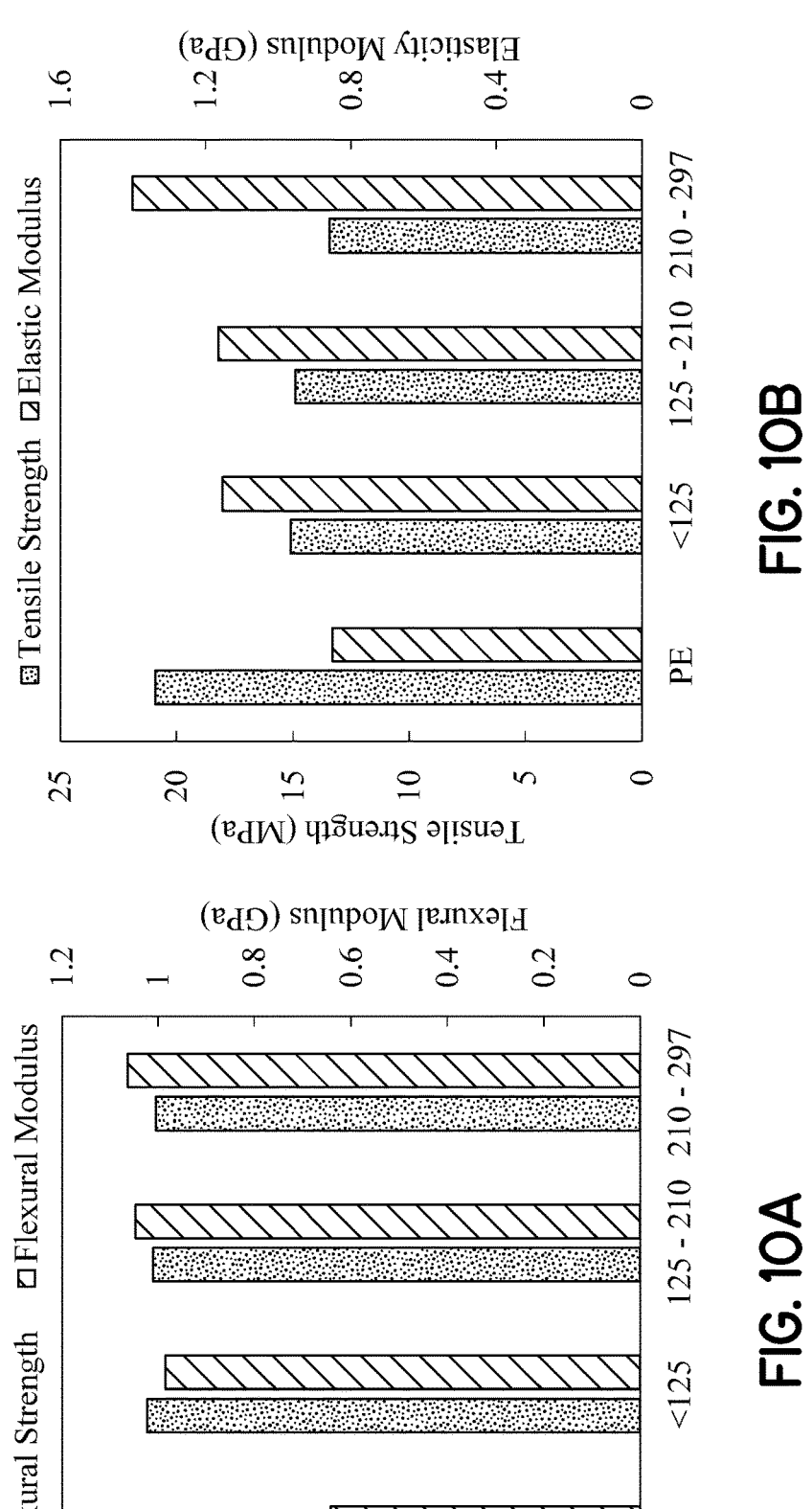
FIGS. 10A and 10B are graphs showing properties of composites made with 30 wt % coal and 3 wt % MAPE, with FIG. 10A showing flexure strength and flexure modulus results, and FIG. 10B showing tensile strength and modulus of elasticity results. Pittsburgh No. 8 coal sizes evaluated include <125 μm, 125-210 μm and 210-297 μm.

FIG. 10 shows the tensile strength and elastic modulus, and flexural strength and modulus of HDPE-CPCs with Pittsburgh No. 8 coal with three different particle size distributions i.e., particles with average diameter <125 μm, 125-210 μm and 210-297 μm to evaluate the effect of additive size variation on CPC mechanical properties. These CPCs were made of 70 wt % and 30 wt % coal. Results show that the addition of 30 wt % coal decreased the tensile strength and increased the flexural strength of the PE substrate. The highest improvement in flexural strength was observed when the smallest coal particles with average size <125 μm were added to the thermoplastic and were therefore selected to make CPCs for further testing.

c. Effect of Coal Content

Figure 11B:
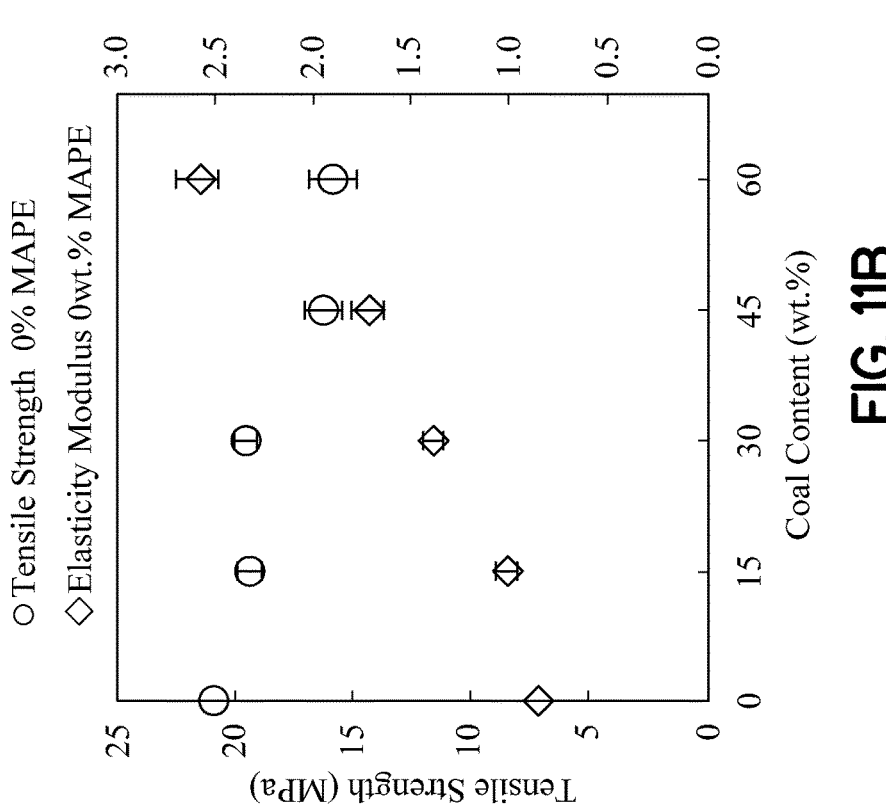
FIGS. 11A and 11B are graphs showing flexure properties (FIG. 11A) and (FIG. 11B) tensile properties of HDPE-CPCs composed of 0-60 wt % Pittsburgh No. 8 without coupling agent.
Figure 11A:
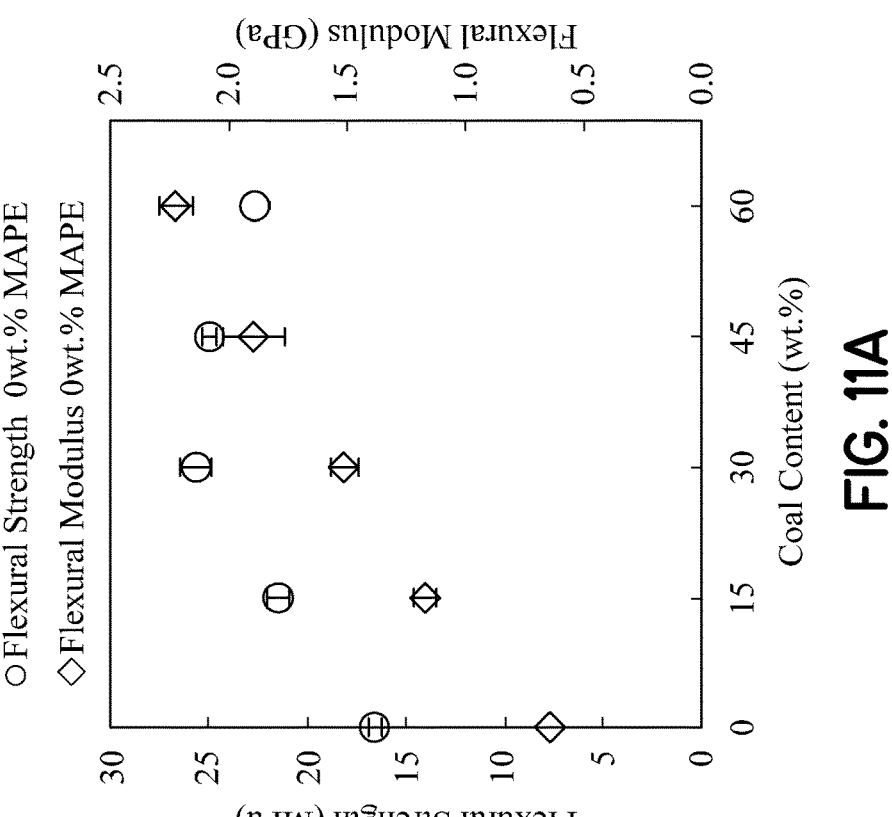
Figures 12A, 12B:
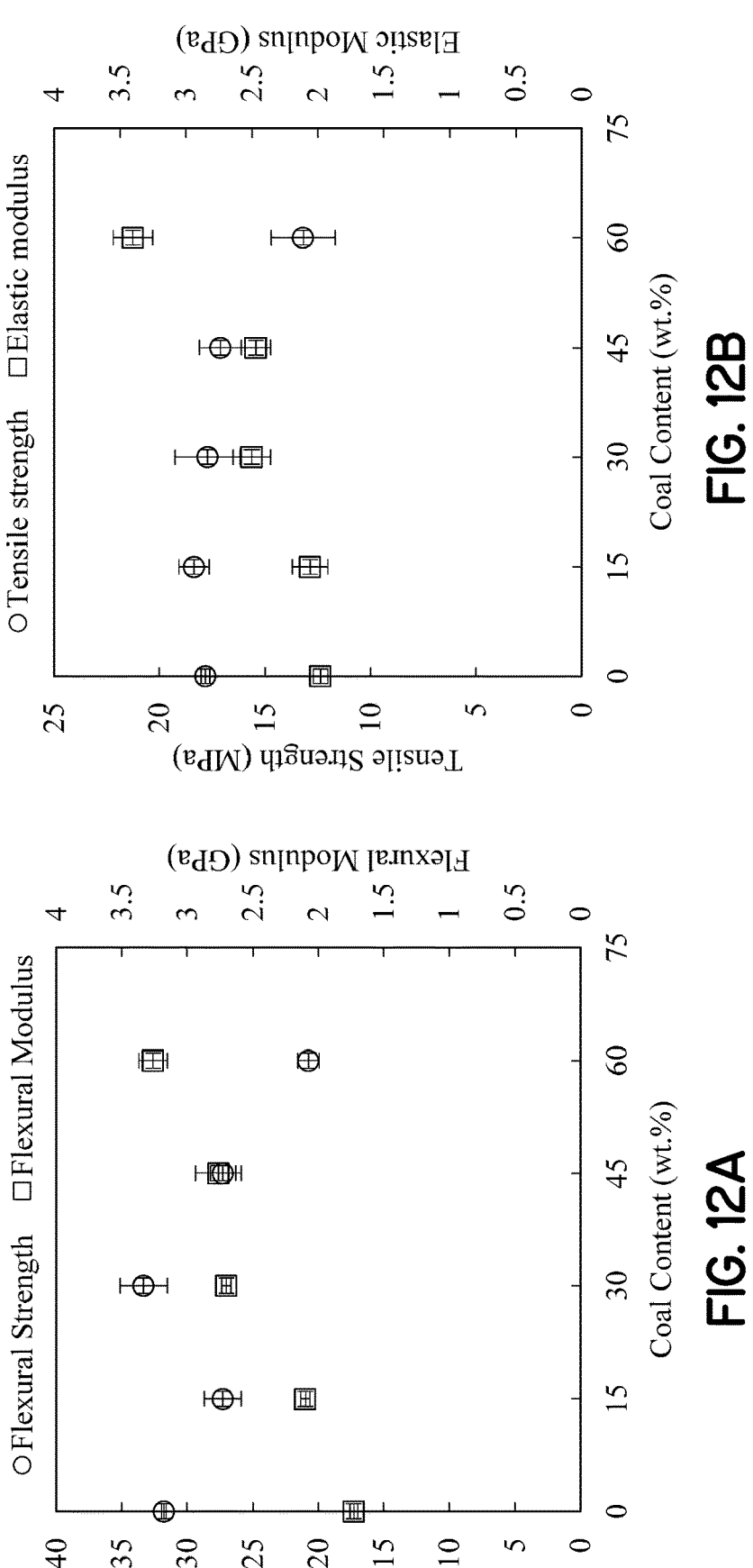
FIGS. 12A and 12B are graphs showing flexure properties (FIG. 12A) and tensile properties (FIG. 12B) of HDPP-CPCs composed of 0-60 wt % Pittsburgh No. 8 without coupling agent.

FIG. 11 and FIG. 12 present the flexure and tensile properties of the HDPE-CPCs and HDPP-CPCs respectively, with varying coal content without coupling agent. HDPE-CPC flexural strength was maximized at 30 wt % with a 55% increase, while the minimum increase of 22% was found at 60 wt %. Adding coal initially decreased the flexural strength of HDPP-CPC but eventually increased after a coal loading of 30 wt % HDPP-CPC flexural strength was also maximum at 30 wt % with an increase of about 5%, while adding 60 wt % coal decreased it by 35%

Increased flexural modulus is expected for reinforced polymers; with an increase in particulate filler content, the capacity of the composite to elastically deform decreases. Kajaks et al. saw a similar increase in flexural strength of 57.3% at 50 wt % pine wood flour and a decrease in flexural strength with filler content above 50 wt % [J. Kajaks, A. Zagorska and A. Mezinskis, "Some exploitation properties of wood plastic composites (WPC), based on high density polyethylene and timber industry waste," Materials Science, 2015]. As expected, CPC tensile strength decreased with increasing coal content with a 24% decrease found at 60 wt %. This is likely due to an increase in the number of stress concentrations around the filler particles [S. Fu, X. Feng, B. Lauke and Y. Mai, "Effects of particle size, particle_matrix interface adhesion and particle loading on mechanical properties of particulate-polymer composites," Composites: Part B, pp. 933-961, 2008], [S. Ahmed and F. Jones, "A review of particulate reinforcement theories for polymer composites," Journal of Materials Science, pp. 4933-4942, 1990]. The transfer of stress from the composite matrix and filler particles is a factor, the interfacial interactions between the matrix material and filler influences the mechanical behavior of the composite with reinforcing fillers. Without interfacial bonding, the filler particles will separate from the matrix material when experiencing tensile stress; this distorting space around the filler particle becomes a concentrated stress area.

Similar tensile strength and elasticity modulus results have been demonstrated with coal-based additives such as fly ash and coal gangue [G. Gong, B. Xie, M. Yang, W. Yang, W. Zhang and M. Zhao, "Mechnanical properties and fracture behavior of injection and compression molded polypropylene/coal gangue powder composites with and without a polymeric coupling agent," Composites: Part A, pp. 1683-1693, 2007], [U. Atikler, D. Basalp and F. Tihminlioglu, "Mechanical and Morphological Properties of Recycled High Density Polyethylene, Filled with Calcium Carbonate and Fly Ash," Wiley Interscience, 2006], [I. Ahmad and P. Mahanwar, "Mechanical properties of Fly Ash Filled High Density Polyethylene," Journal of Minerals & Materials Characterization & Engineering, pp. 183-198, 2010], [S. Pardo, C. Bernal, A. Ares, M. Abad and J. Cano, "Rheological, Thermal, and Mechanical Characterization of Fly Ash-Thermoplastic Composites with Different Coupling Agents," Polymer Composites, pp. 1722-1730, 2010]. Atikler et al. reported similar tensile strength losses in polyethylene composites made with 40 wt % calcium carbonate and fly ash of 34.3 and 40.3%, respectively [U. Atikler, D. Basalp and F. Tihminlioglu, "Mechanical and Morphological Properties of Recycled High Density Polyethylene, Filled with Calcium Carbonate and Fly Ash," Wiley Interscience, 2006]. Ahmad and Mahanwar found a range of tensile strengths at 40 wt % fly ash (−2 to 8%) compared to the base HDPE, when using particle size ranges between 14-50 μm [I. Ahmad and P. Mahanwar, "Mechanical properties of Fly Ash Filled High Density Polyethylene," Journal of Minerals & Materials Characterization & Engineering, pp. 183-198, 2010]. Huang et al. found that with increasing wood content in a HDPE matrix, the tensile strength decreased by 11.6 and 17.2% at 20 and 50 wt % wood content, respectively [H. Huang and J. Zhang, "Effects of filler-filler and polymer-filler interactions on rheological and mechanical properties of HDPE-wood composites," Journal of Applied Polymer Science, pp. 2806-2812, 2009]. Similarly, Pardo et al. observed polypropylene-based composite tensile strength losses of 27.3 and 39.2% with fly ash filler contents of 30 and 40 wt %, respectively [S. Pardo, C. Bernal, A. Ares, M. Abad and J. Cano, "Rheological, Thermal, and Mechanical Characterization of Fly Ash-Thermoplastic Composites with Different Coupling Agents," Polymer Composites, pp. 1722-1730, 2010].

Several previous efforts attempted to model the elastic modulus of particulate reinforced composites including those by Einstein, Guth, Halpin and Tsai, and Kerner et al [S. Fu, X. Feng, B. Lauke and Y. Mai, "Effects of particle size, particle_matrix interface adhesion and particle loading on mechanical properties of particulate-polymer composites," Composites: Part B, pp. 933-961, 2008]. These models take into consideration variables such as filler content, filler particle size, and particle-matrix adhesion quality. Kerner's model accounts for the filler volume fraction and assumes spherical particles without adhesion between matrix and particles when estimating the elasticity modulus [E. H. Kerner, "The elastic and thermo-elastic properties of composite media," Proceedings of the Physical Society, pp.

Figure 13:
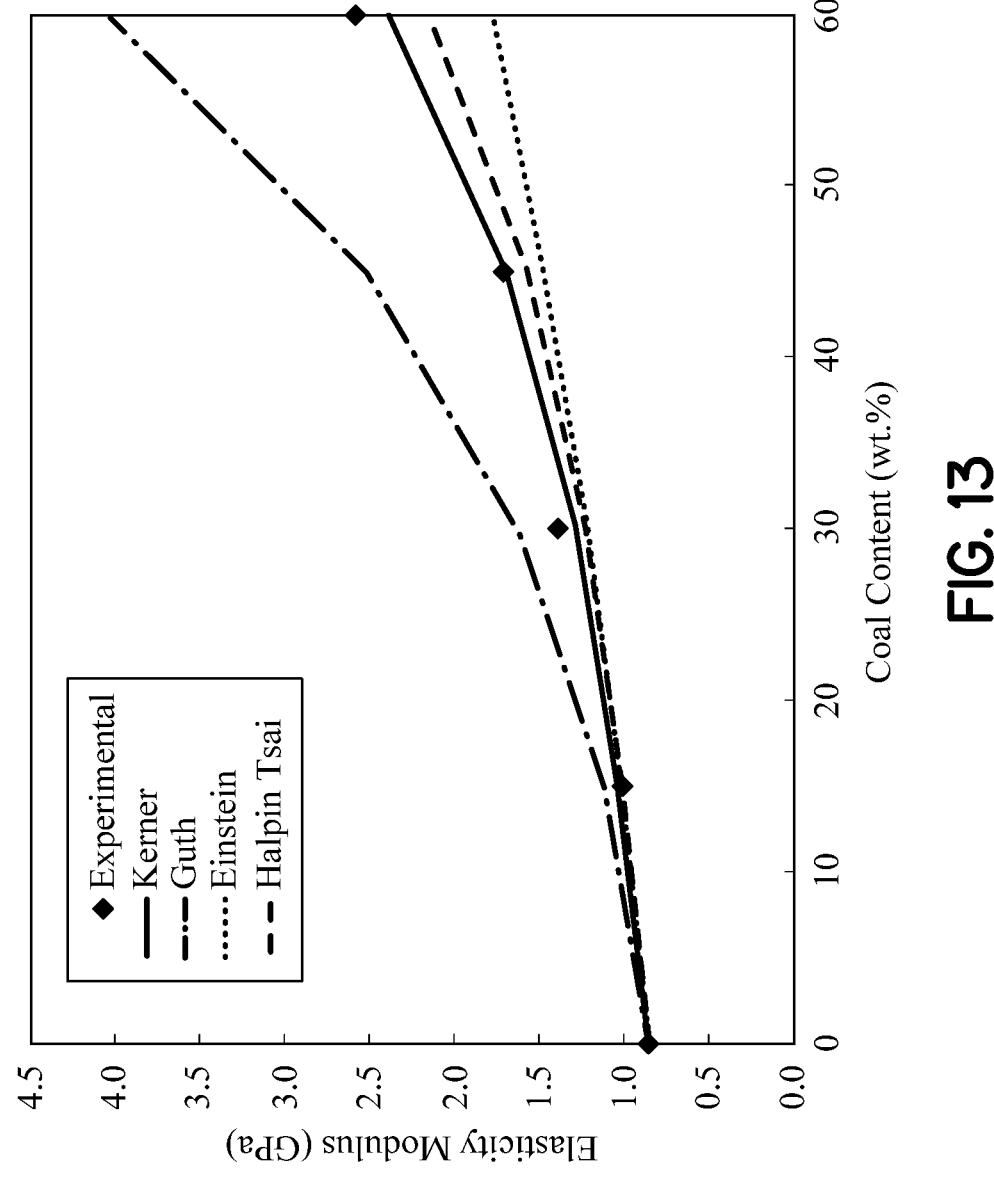
FIG. 13 is a graph showing a comparison of elasticity modulus results of coal filled composite with 0 wt % MAPE and multiple models for estimating elasticity modulus.

808-813, 1956]. The elasticity modulus results for CPCs without MAPE closely fit the elasticity modulus estimated by Kerner's model, as shown in FIG. 13. The observed elasticity modulus trend, indicates the coal behaves as a spherical filler particle with an aspect ratio near 1.

d. Effect of Polymer Type

Table 8 presents the flexural strength, flexural modulus, tensile strength and elastic modulus of the CPCs made with different polymers, namely virgin and recycled HDPE. Two different coal contents were evaluated: 30 wt % and 60 wt %. CPCs made with virgin polymers demonstrated better mechanical properties compared to those made with recycled properties. Using recycled-HDPE in place of virgin-HDPE to make CPCs with 30 wt % coal decreased the flexural strength by 36% and tensile strength by 43%. Interestingly, contrary to the trend demonstrated by virgin-HDPE, increasing coal content in the CPCs with recycled-HDPE from 30 wt % to 60 wt % increased both the flexural strength and the tensile strength: CPCs with virgin-HDPE demonstrate lowered mechanical performance at higher coal content. Without being bound to any theory, the present inventors posit that the lowered tensile and flexural properties demonstrated by recycled-HDPE CPCs may be due to the inherently lowered strength of recycled plastics due to additional thermal cycling during their treatment.

TABLE 8

Flexural and tensile properties of CPCs
made with HDPE and R-HDPE polymers.

| CPC | Flexural strength (MPa) | Flexural modulus (GPa) | Tensile strength (MPa) | Elastic modulus (MPa) |
|---|---|---|---|---|
| HDPE/ 30 wt. % coal | 25.68 ± 0.29 | 1.51 ± 0.03 | 19.51 ± 0.24 | 1.38 ± 0.03 |
| R-HDPE/ 30 wt. % coal | 16.34 ± 0.46 | 1.33 ± 0.02 | 11.19 ± 0.09 | 1.17 ± 0.03 |
| HDPE/ 60 wt. % coal | 22.66 ± 0.19 | 2.22 ± 0.04 | 15.81 ± 0.51 | 2.57 ± 0.06 |
| R-HDPE/ 60 wt. % coal | 19.74 ± 0.71 | 2.16 ± 0.06 | 15.68 ± 0.20 | 2.04 0.10 | e. Effect of Coupling Agent Content

Figures 14A, 14B:
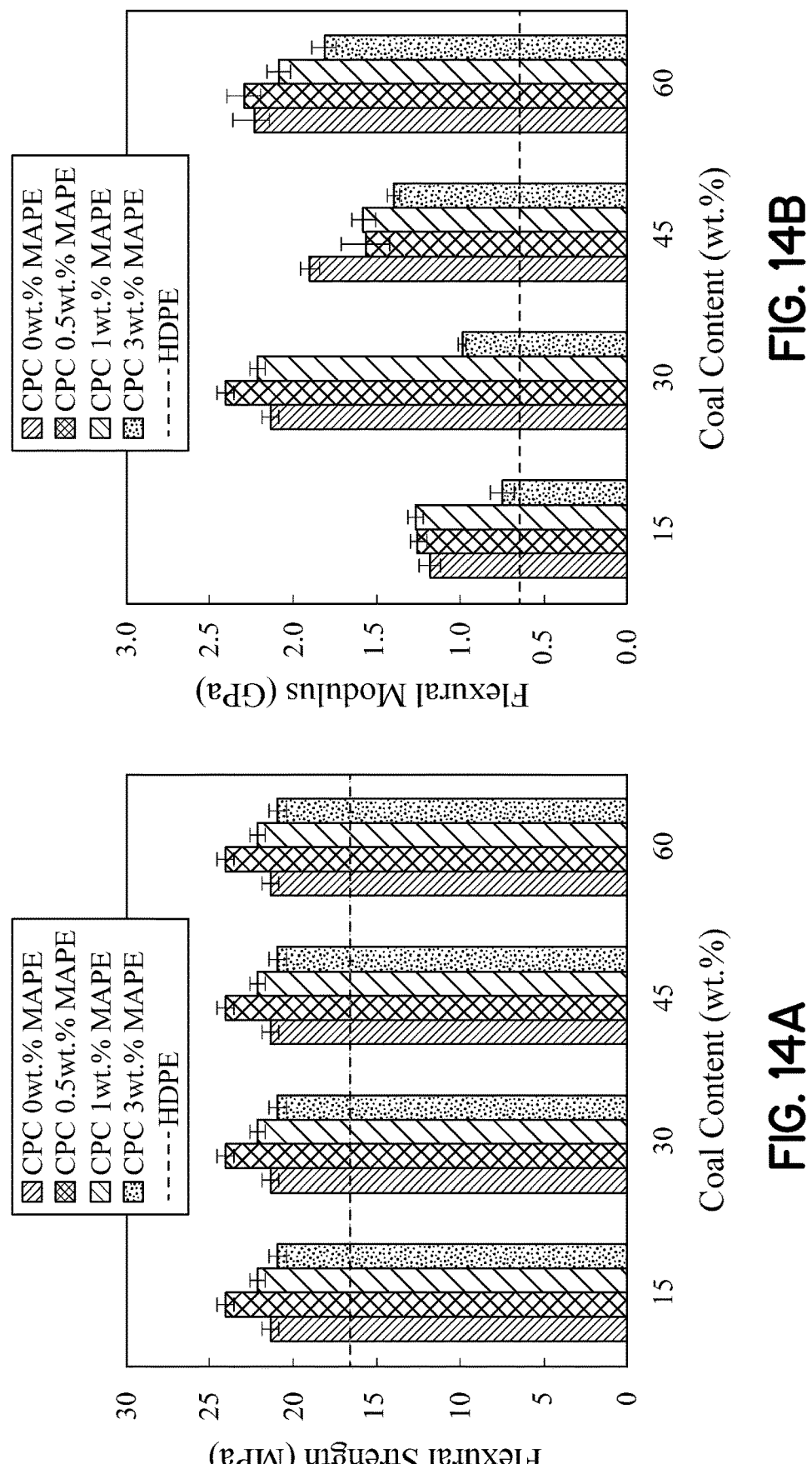
FIGS. 14A and 14B are graphs showing flexure strength (FIG. 14A) and flexure modulus (FIG. 14B) of HDPE-CPCs with varying Pittsburgh No. 8 and MAPE content.

The effect of MAPE content in conjunction with Pittsburgh No. 8 coal was studied. In WPCs, MAPE is expected to promote adhesion between the filler material and the PE matrix, thereby increasing composite strength and deformation capacity. Specifically, basic surface functionalities (hydroxyl groups) present on the filler material surface bond with the grafted maleic acid portion of the MAPE, while the HDPE portion of the MAPE entangles with the HDPE matrix of the composite [G. Gong, B. Xie, M. Yang, W. Yang, W. Zhang and M. Zhao, "Mechnanical properties and fracture behavior of injection and compression molded polypropylene/coal gangue powder composites with and without a polymeric coupling agent," Composites: Part A, pp. 1683-1693, 2007]. To some extent, coal has similar surface functionality as biomass and as such MAPE was selected for initial coupling agent studies. FIG. 14 shows the flexural strength and modulus results of HDPE-CPCs coal content ranging from 0 to 60 wt % and MAPE content ranging from 0 to 3 wt %.

Figures 15A, 15B:
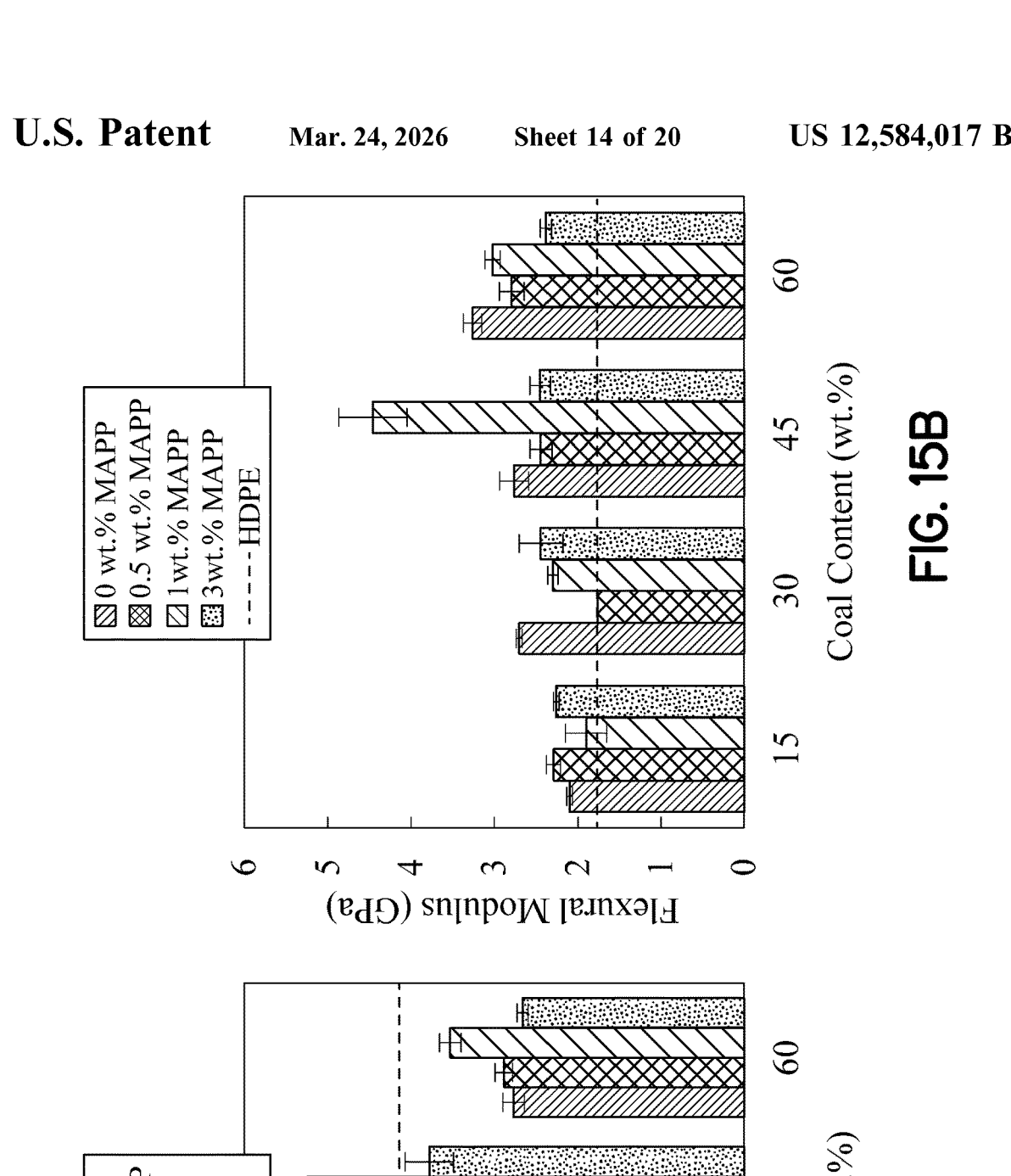
FIGS. 15A and 15B are graphs showing flexure strength (FIG. 15A) and flexure modulus (FIG. 15B) of HDPP-CPCs with varying Pittsburgh No. 8 and MAPE content.

FIG. 15 shows the flexural strength and modulus results of HDPP-CPCs coal content ranging from 0 to 60 wt % and MAPP content ranging from 0 to 3 wt %. The results show MAPE having no clear effect on the flexural strength of the CPC with 0.5 wt % MAPE and a negative effect on the flexural strength of composites with 1 wt % and 3 wt % MAPE. On the other hand, MAPP shows a detrimental effect on the flexural strength of HDPP-CPCs. At 30 wt % coal loading, the addition of 1 and 3 wt % MAPE saw a decrease of 9% and 17% in flexural strength respectively, when compared to that of 30 wt % coal composite without MAPE. Results involving wood flour as filler material for HDPE show comparable increases in flexural strength with increase in filler content, however the addition of MAPE saw an improvement in the flexural strength of the composite [S. Leu, T. Yang, S. Lo and T. Yang, "Optimized material composition to improve the physical and mechanical properties of extruded WPCs," Contrustion and Building Materials, vol. 29, pp. 120-127, 2012], [M. Tabakhpaz, A. Behravesh, P. Shahi and A. Zolfaghari, "Procedure effect on the physical and mechanical properties of the extruded wood plastic composites," Polymer Composites, vol. 34, no. 8, pp. 1349-1356, 2013]. Kajaks et al. observed a maximum increase of 7% in flexural strength using a MAPE content of 3 wt % with 50 wt % wood flour [J. Kajaks, A. Zagorska and A. Mezinskis, "Some exploitation properties of wood plastic composites (WPC), based on high density polyethylene and timber industry waste," Materials Science, 2015]. Li et al. observed an increase in the flexural strength of 88% using 3 wt % MAPE in a 70 wt % wood flour composite [S. Leu, T. Yang, S. Lo and T. Yang, "Optimized material composition to improve the physical and mechanical properties of extruded WPCs," Contrustion and Building Materials, vol. 29, pp. 120-127, 2012].

Figures 16A, 16B:
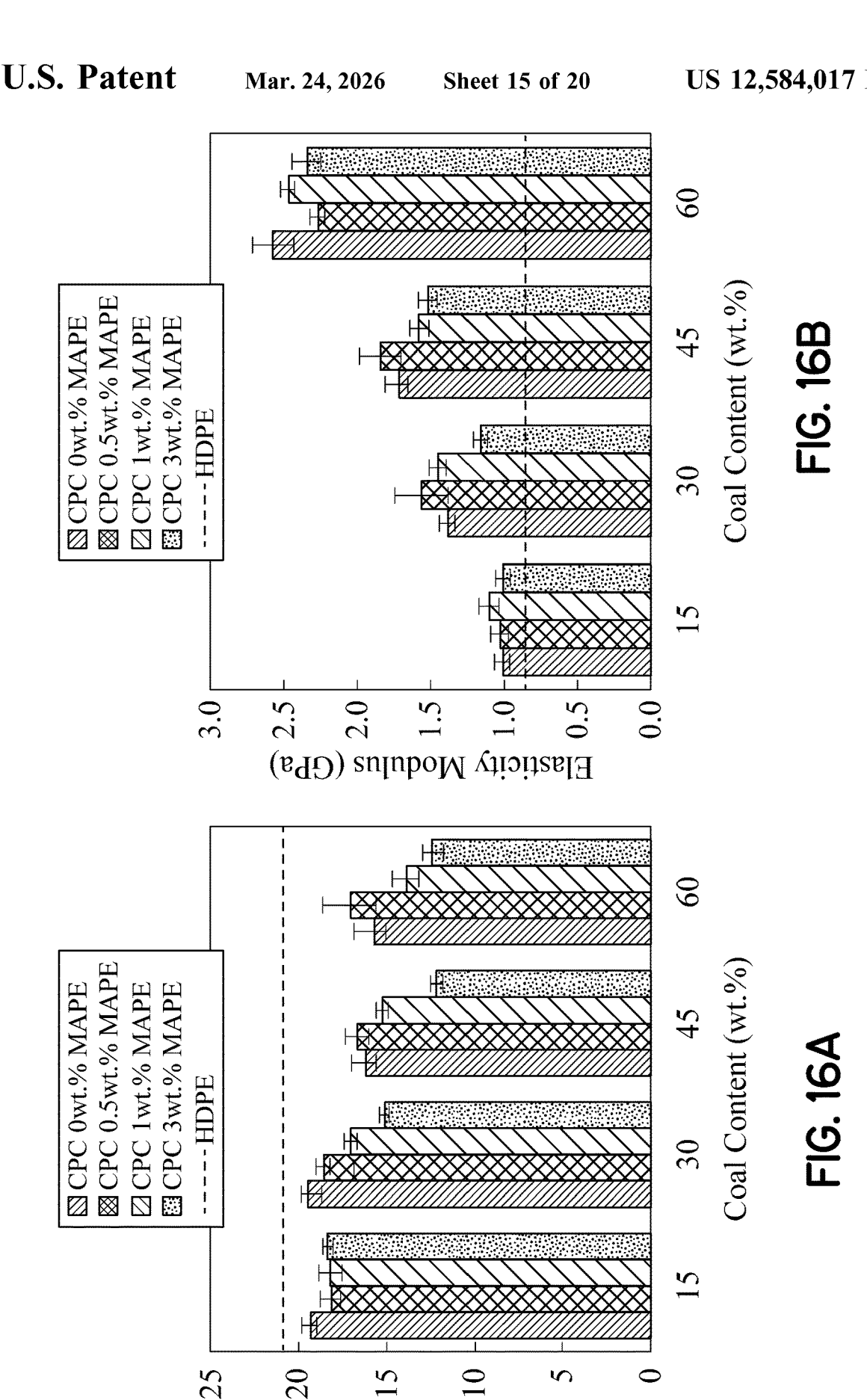
FIGS. 16A and 16B are graphs showing tensile strength (FIG. 16A) and tensile modulus (FIG. 16B) of HDPE-CPCs with varying Pittsburgh No. 8 and MAPE content.
Figures 17A, 17B:
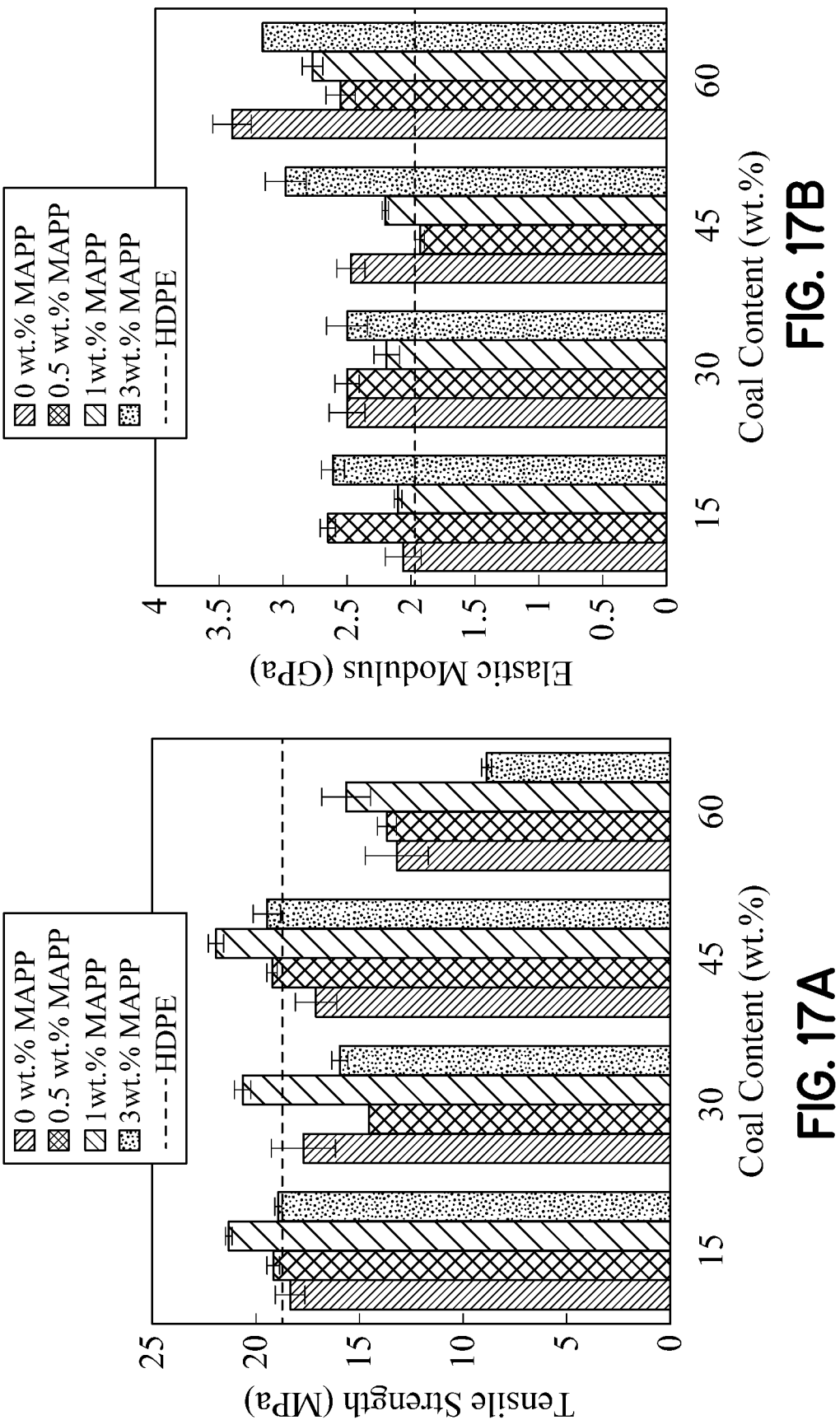
FIGS. 17A and 17B are graphs showing tensile strength (FIG. 17A) and tensile modulus (FIG. 17B) of HDPP-CPCs with varying Pittsburgh No. 8 and MAPE content.

FIG. 16 shows the tensile strength and elasticity modulus results for HDPE-CPCs for coal and MAPE contents ranging from 0 to 60 wt % and 0 to 3 wt %, respectively. FIG. 17 shows the tensile strength and elasticity modulus results for HDPP-CPCs for coal and MAPP contents ranging from 0 to 60 wt % and 0 to 3 wt %, respectively. The addition of coupling agents, over the entire content range, decreased tensile strength and had little impact on elasticity modulus. Contrarily, Li et al. showed improved tensile strength of 143.5% using 3 wt % MAPE in a 50 wt % wood flour composite [S. Leu, T. Yang, S. Lo and T. Yang, "Optimized material composition to improve the physical and mechanical properties of extruded WPCs," Contrustion and Building Materials, vol. 29, pp. 120-127, 2012]. Deng and Tang also observed improved tensile strength, with an increase of 26% with the addition of 3 wt % MAPE in a 40 wt % wood flour composite [U. Atikler, D. Basalp and F. Tihminlioglu, "Mechanical and Morphological Properties of Recycled High Density Polyethylene, Filled with Calcium Carbonate and Fly Ash," Wiley Interscience, 2006]. Similarly, Huang et al. observed a 93% increase in tensile strength with the addition of 5 wt % MAPE in a 50 wt % wood flour composite [H. Huang and J. Zhang, "Effects of filler-filler and polymer-filler interactions on rheological and mechanical properties of HDPE-wood composites," Journal of Applied Polymer Science, pp. 2806-2812, 2009].

f. Coal Surface Functionality Results

Results from this study showed the addition of coupling agents to the CPC material had little effect or even reduced flexure/tensile strength. To further elucidate potential causes for this behavior, coal surface functionality (acid/base groups) was investigated and compared to a typical pine-based wood flour used in WPC manufacturing. Boehm titrations (known to those of ordinary skill in the art) were performed to characterize the acid/base functional groups present on the surface of the coal and wood flour. Both direct and back titration methods were used to determine acid/base surface functionality concentrations.

17

Figure 18:
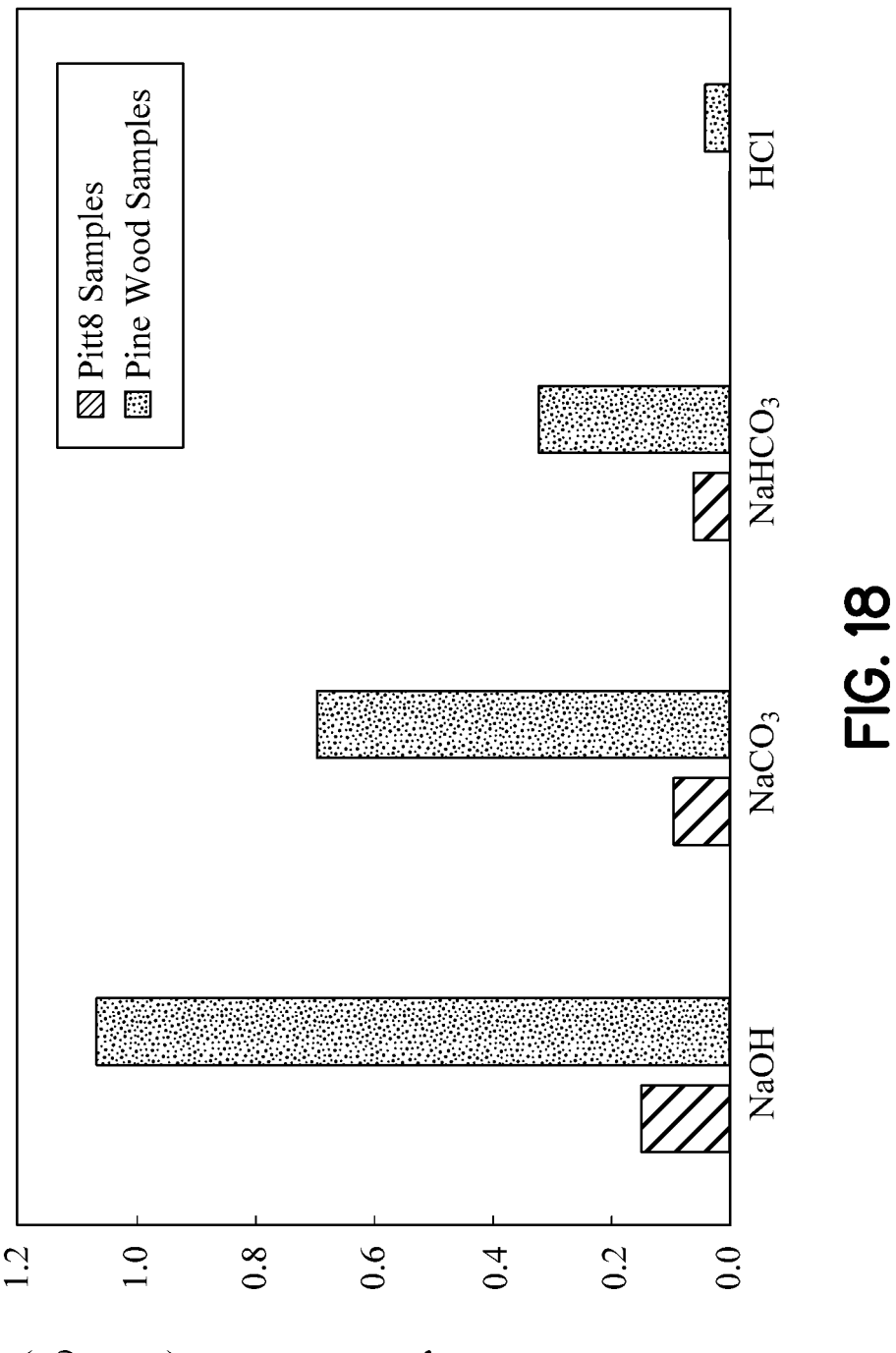
FIG. 18 is a graph showing comparison of coal and wood flour surface functionalities determined using a Boehm analysis.

FIG. 18 presents a summary of the Boehm analyses and surface functionality groups found on the Pittsburgh No. 8 and pine wood flour samples. The surface functional group concentrations of the pine wood flour are comparable to previously reported pine wood Boehm analyses results [U. Atikler, D. Basalp and F. Tihminlioglu, "Mechanical and Morphological Properties of Recycled High Density Polyethylene, Filled with Calcium Carbonate and Fly Ash," Wiley Interscience, 2006]. Overall, Pittsburgh No. 8 showed lower surface functionality in comparison to the pine wood flour in all categories. Acid site distributions between the coal and pine wood were similar, though the pine wood contained higher concentrations of these functional groups. Base site (hydroxyl groups) concentration on the coal surface was found to be below the detection limit for the Boehm analysis method, which was $1 \cdot 10^{-3}$ mmol·g$^{-1}$. Base sites were detected on the pine wood surface (0.044 mmol·g$^{-1}$), although at lower concentration in comparison to acid sites.

Without being bound to any theory, the present inventors submit the lower availability of hydroxyl groups on the Pittsburgh No. 8 surface is a likely factor for coupling agent impact on CPC flexural and tensile strength behavior, as insufficient reaction sites were available to bond with the grafted maleic acid. The reduction of flexure and tensile strength was more apparent in CPCs with greater coal content. These phenomena may be a result of less adhesion between the coal filler and the polymer matrix, caused by the interface between the coal surface and grafted maleic acid. These initial study results indicate further consideration is needed when considering the addition of coupling agent to improve CPC flexure/tensile strength. Alternative coupling agents which introduce polymer matrix crosslinking, such as silanes, may be better suited for such applications [S. Pardo, C. Bernal, A. Ares, M. Abad and J. Cano, "Rheological, Thermal, and Mechanical Characterization of Fly Ash-Thermoplastic Composites with Different Coupling Agents," Polymer Composites, pp. 1722-1730, 2010, incorporated by reference herein in its entirety], [M. Deepthi, M. Sharma, R. Sailaja, P. Anantha, P. Sampathkumaran and S. Seetharamu, "Mechancial and thermal characteristics of high density polyethylene-fly ash cenospheres composites," Materials Design, vol. 31, no. 4, pp. 2051-2060, 2010, incorporated by reference herein in its entirety]. Further, modification of coal surface functionality to increase bonding with maleic acid may allow for commercially available MAPE coupling agents to improve CPC mechanical properties as observed with WPCs [S. Deng and Y. Tang, "Increasing load bearing capacity of wood plastic composites by sandwiching natural and glass fabrics," Journal of Reinforced Plastic Composites, vol. 29, no. 20, pp. 3133-3148, 2010, incorporated by reference herein in its entirety], [J. Kajaks, A. Zagorska and A. Mezinskis, "Some exploitation properties of wood plastic composites (WPC), based on high density polyethylene and timber industry waste," Materials Science, 2015, incorporated by reference herein in its entirety], [Y. Li, "Effect of coupling agent concentration, fiber content, and size on mechanical properties of wood/HDPE composites," International Journal of Polymeric Materials and Polymeric Biomaterials, pp. 882-890, 2012, incorporated by reference herein in its entirety].

18

TABLE 9

| | Surface functional groups on coal and wood flour particles determined using Boehm methodology. | | | |
|---|---|---|---|---|
| Particle | Weak acid (mmol/g) | Moderate acid and lactones (mmol/g) | Strong acid (mmol/g) | Basic (mmol/g) |
| Pittsburgh No. 8 coal | 0.053 | 0.033 | 0.063 | <0.001 |
| Pine wood flour | 0.376 | 0.371 | 0.321 | 0.043 |

Water Absorption Results

Figure 19:
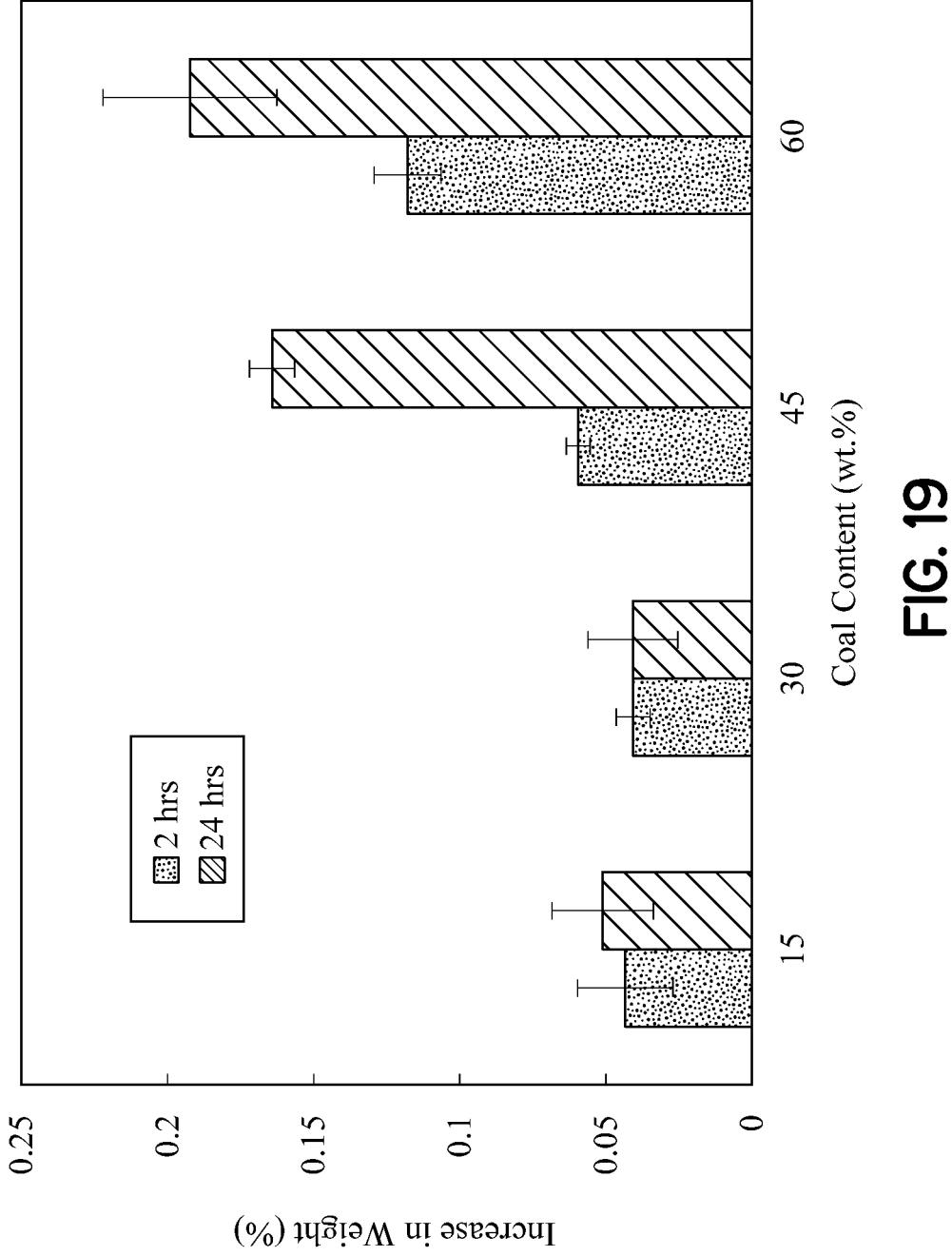
FIG. 19 is a graph showing water absorption capacity of HDPE-CPCs with Pittsburgh No. 8 coal as a function of coal content.

Water absorption tests were performed to evaluate CPC tendency to absorb moisture, by submerging samples containing 15-60 wt % coal in DI water. The water absorption test results are shown in FIG. 19. Increase of CPC sample mass upon submersion in DI water were all found to be well below 1 wt % (0.04-0.19%), with slight absorption capacity increasing with coal content. Similar studies with WPCs using HDPE containing 50 to 70 wt % wood flour have shown weight increase of 0.9-3.5 wt % [H. Huang and J. Zhang, "Effects of filler-filler and polymer-filler interactions on rheological and mechanical properties of HDPE-wood composites," Journal of Applied Polymer Science, pp. 2806-2812, 2009]. Lower water absorption rates for the CPCs were expected as the bituminous coal has low water absorption tendency, whereas wood is strongly hydrophilic and readily absorbs water. Such a composite property could be beneficial in applications in which the composite is directly exposed to the environment, decreasing potential for freeze thaw damage or staining.

Coefficient of Thermal Expansion Analysis

Figure 20:
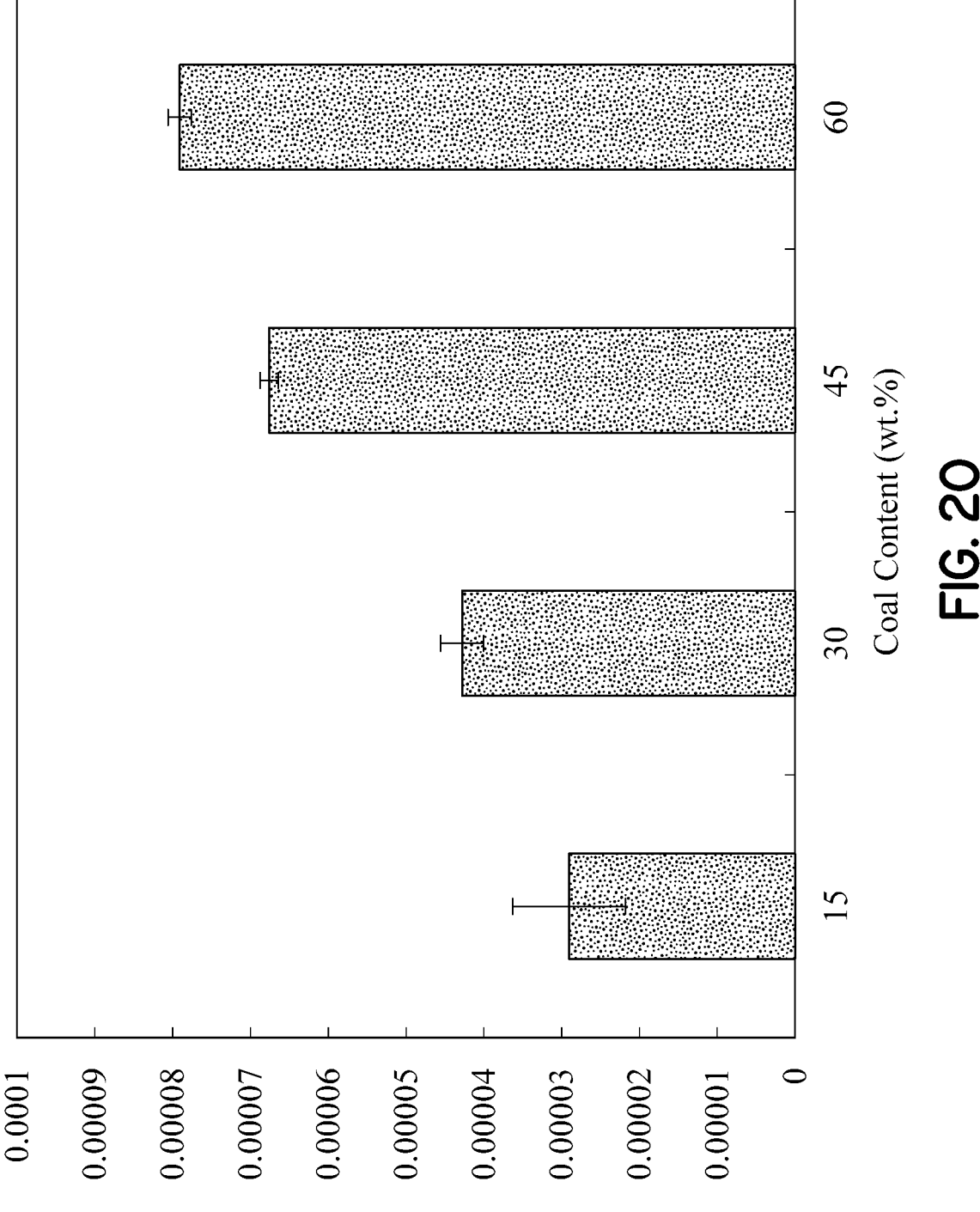
FIG. 20 is a graph showing the coefficient of thermal expansion of HDPE-CPCs with coal content ranging from 15 wt % to 60 wt %.

FIG. 20 shows the CTE of HDPE-CPC samples with Pittsburgh No. 8 coal as a function of varying coal content. Results show that the CTE trend is linear and increases with the increase in coal content in the CPC. This indicates that the coal particles actively participate in thermal transport in the CPC matrix. The CTE of the CPC is much reduced when compared to virgin HDPE, which ranges from 0.000106 to 0.000120 K$^{-1}$. On the other hand, the measured CTE values are within those of commercial WPCs namely ChoiceDek and Trex whose CTE was measured to be 0.0000363 K$^{-1}$ and 0.00009 K$^{-1}$ respectively.

Leaching Results

Figure 21:
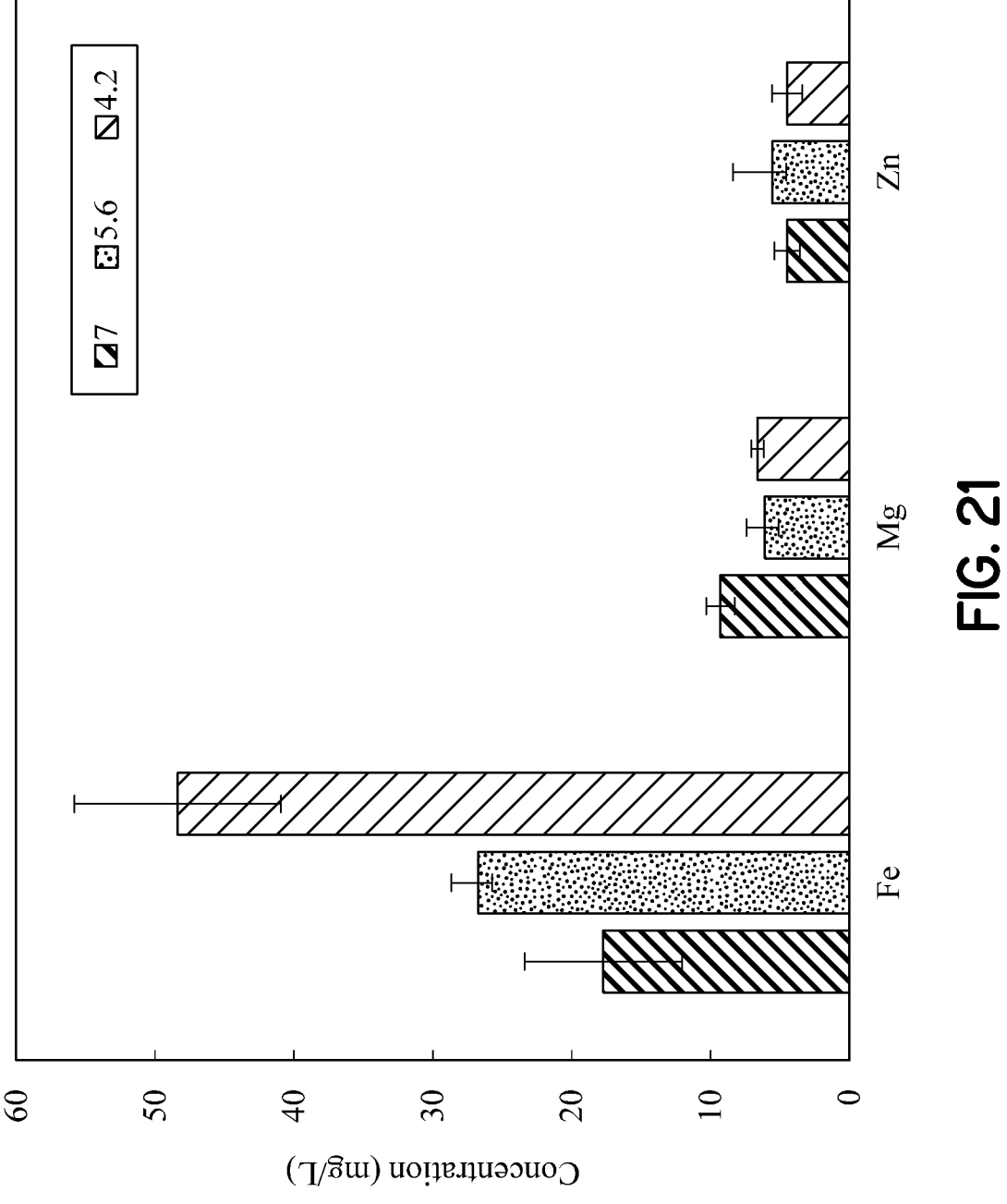
FIG. 21 is a graph showing the concentration of detectible metals leached out of coal plastic composite of 60 wt % coal after three months.

FIG. 21 shows the concentration of detectable metals leached out of an HDPE-CPC sample with 60 wt % Pittsburgh No. 8 coal and no coupling agent. Levels of Al, As, Be, Cd, Cr, Pb, Se, Ni, and Hg were all found to be below their respective lowest detectible limits of the ICP-MS and below the EPA promulgated TCLP limits. Concentration of Fe, Mg, and Zn leached out of CPCs in the acid solution were found to be above detectible limits at trace concentrations of less than 50 mg/L as shown in FIG. 21. For iron, significantly higher concentrations were extracted at higher nitric acid concentrations. Detectible limits are sufficiently low for As, Cd, and Cr to indicate that there is not a significant amount of these heavy metals leaching from the coal solution.

Discussion/Analysis

The study detailed in this Example evaluated the effectiveness of using various types of coals (namely Pittsburgh No. 8, Kittaning, and Upper Freeport) as reinforcing fillers to make coal plastic composites (CPCs) for applications in place of commercially available wood plastic composites (WPCs). Coal particle sizes examined included <125 µm, 125-250 µm, and >250 µm. Thermoplastics evaluated as polymer matrices included virgin-high density polyethylene (HDPE) and polypropylene (HDPP), as well as recycled-HDPE. The effect of material and processing parameters, such as coal type, coal particle size, coal content, polymer type, and coupling agent content on flexural and tensile performance, water absorption, heavy metal leaching, and coefficient of thermal expansion of the CPCs was evaluated.

Results showed HDPE-CPCs with 30 wt % coal content with no coupling agent performed on par with commercial WPCs with a flexural strength of 25.68 MPa. Pittsburgh No. 8 coal type with an average particle size <125 μm showed the best performance as filler material owing to high surface area to volume ratio of the fillers. Using recycled-HDPE as polymer matrix decreased the flexural strength of HDPE-CPCs with 30 wt % coal by about 36%. CPCs absorbed significantly lower amounts of water compared to commercially available WPCs such as Trex and ChoiceDek, making them ideal materials for outdoor applications such as decking materials. Additionally, heavy metal leaching from CPCs was measured at trace levels and observed to be lower than the EPA promulgated limits. Coefficient of thermal expansion of CPCs was found to increase linearly with coal content and within the ranges of those measured for commercial WPCs.

The present inventors have demonstrated a viable end application for coal that does not generate any by-products or require coal purification. Recycling and reusing CPCs will be easier compared to WPCs since the CPCs can withstand higher processing temperatures owing to the thermal stability of coal particles at recycling temperatures compared to wood flour. There are also economic benefits to the use of CPCs.

Economic Analysis

Commercially available WPC materials (Trex, AZEK, or ChoiceDek composite decking) have costs ranging from 0.96-1.74 $/lb, depending upon manufacturer and composite specifications (i.e. color, UV/stain resistance, etc.). To determine the economic competitiveness of CPC (such as those described herein), preliminary economic analyses (±30%) were completed for systems utilizing 50,000 tons of coal annually as presented in Table 10. This coal usage rate was based upon a typical regional manufacturing plant, such as those employed by Trex Company, Inc. The CPC product was assumed to contain 60 wt % coal. Capital and operating costs for the studies were based upon reports for similar WPC studies [B. English, "Waste wood derived fillers for plastics," General Technical Report FPL-GTR-91, 2005]. Compounding system costs included extruders, feeders, and pelletizers. The levelized capital charge factor was determined assuming a discount factor of 7% over a 10-year term.

Current thermoplastic resin and coal prices were used in the studies. Other operating expenses including wages, electrical, and maintenance were based upon costs reported for production of WPCs. Results from the economic summary show the CPC manufacturing or break-even sales price (BESP) does not have a strong dependence upon the capital cost of the system. This is expected; as such compounding facilities are significantly less complex than typical processes utilizing coal such as power plants or gasification facilities. CPC price was found to be strongly dependent upon polymer costs, as are commercial WPC materials. Based upon current sales pricing for composite products, a CPC product (such as that described herein) shows a very attractive return on investment (ROI) range of 37-148%. Although costs of additional additives such as colorants and coupling agents were not included in the study such additive costs are expected to be minimal based upon industry literature.

TABLE 10

Summary of economic analysis for CPC costing.

| Parameter | Value |
| --- | --- |
| Coal Feedrate (tph) | 5.7 |
| CPC Output (tph) | 10 |
| Capacity Factor | 0.85 |
| Levelized Cap. Charge Factor | 0.14 |
| Capital Expenses | Value ($MM) |
| Land, Building, and Furnishings | 3.1 |
| Coal Storage and Handling | 2.0 |
| Compounding Systems (Extruder, Feeders, Pelletizer) | 7.8 |
| Handling and Packaging | 1.0 |
| Total Installed Capital | 13.9 |
| Operating Expenses | ($/lb) |
| Cost of Capital | $0.014 |
| Coal ($45/ton) | $0.016 |
| Polymers ($0.7/lb) | $0.471 |
| Wages plus Overhead | $0.060 |
| Electrical | $0.080 |
| Maintenance | $0.060 |
| BESP | $0.700 |
| ROI (0.96-1.74 $/lb Sales Price) | 37-148% | a. Anticipated Market

CPCs in the current project are researched as a replacement for WPCs. The market for WPCs is significant, with a global value of $4.37 billion in 2015. The largest WPC market segments include building and construction, automotive, and electrical insulation. Tremendous growth in global WPC production is expected with a 12.3% compound annual growth rate (CAGR), reaching 8,500 kilotons in 2022 and a market value of $8.76 billion. WPCs are composed of commodity thermoplastic resins including polyethylene (PE), polypropylene (PP), and polyvinyl chloride (PVC) mixed with finely ground wood powder or wood flour and additives such as colorants and stabilizers. Currently, PE-based WPCs account for 83 percent market share with PVC, PP and other resins accounting for 9, 7, and less than 1 percent of market share, respectively. Current major WPC markets include decking (50%), windows and doors (22%), automotive (14%), and other applications (14%). The market for WPC materials was $2.58 billion in 2014 and is projected to grow to $4.60 billion by 2019 or 6.16M tons of products [Y. Li, "Effect of coupling agent concentration, fiber content, and size on mechanical properties of wood/HDPE composites," International Journal of Polymeric Materials and Polymeric Biomaterials, pp. 882-890, 2012].

b. Market for Byproducts

Since the present application uses coal as a whole product without subjecting it any chemical modifications, there are no by-products observed currently.

c. Effect of Current Results on Technology Incorporation in Marketplace

Current results place the CPC material in optimal position for commercialization. As engineered composite plastics are a growing market many organizations will be interested in manufacturing a lower-cost product. Additionally, this technology is well suited to be developed due to the relatively low capital cost (~$1.5M) to build a minimally sized commercial compounding facility.

d. Coal Use Timetable

Coal is an attractive composite filler, as it is less costly than wood flour (0.023 vs 0.095 $/lb) and is not subject to the issues associated with wood. The preliminary economic assessments described herein indicate CPCs could be manufactured at a cost of 0.7 $/lb compared to current WPC decking products which range from 0.96-1.74 $/lb, resulting in a potential return on investment (ROI) of 36-240%. Based upon WPC manufacturing projections for 2022, a 20% market share capture by 60 wt % CPC materials would increase Ohio coal usage by 1.12 million tons annually (6.6% increase over 2015 Ohio coal receipts). Plastic composites represent a new environmentally benign use of coal as CPCs will likely not be subject to current air or water regulations, as coal criteria components (C, S, heavy metals, etc.) will remain in the composite itself.

e. Pollution Removal Cost

This project used coal as a whole product without subjecting it any post processing. As such, there was no necessity to purify coal particles. Therefore, there are no associated pollutant removal costs.

The embodiments of the present invention recited herein are intended to be merely exemplary and those skilled in the art will be able to make numerous variations and modifications to it without departing from the spirit of the present invention. Notwithstanding the above, certain variations and modifications, while producing less than optimal results, may still produce satisfactory results. All such variations and modifications are intended to be within the scope of the present invention as defined by the claims appended hereto.

What is claimed is:

1. A coal polymer composite consisting of greater than 70 wt % and up to 90 wt % thermoplastic polymer and 10 to 30 wt % pulverized coal;

wherein the particles of pulverized coal have a particle size that falls within a range of 25-50 μm.

* * * * *